(12) United States Patent
Masubuchi et al.

(10) Patent No.: US 6,490,657 B1
(45) Date of Patent: Dec. 3, 2002

(54) CACHE FLUSH APPARATUS AND COMPUTER SYSTEM HAVING THE SAME

(75) Inventors: Yoshio Masubuchi, Kawasaki (JP); Takuya Kano, Tokyo (JP); Hiroshi Sakai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/917,530

(22) Filed: Aug. 26, 1997

(30) Foreign Application Priority Data

Sep. 9, 1996 (JP) ............................................. 8-238157

(51) Int. Cl.[7] ............................................. G06F 12/08
(52) U.S. Cl. ....................... 711/135; 711/143; 711/144; 711/146; 714/13
(58) Field of Search ................................. 711/135, 143, 711/144, 146; 714/13

(56) References Cited

U.S. PATENT DOCUMENTS

| | | | | |
|---|---|---|---|---|
| 5,745,730 A | * | 4/1998 | Nozue et al. ................. | 711/135 |
| 5,828,821 A | * | 10/1998 | Hoshina et al. ............. | 711/142 |
| 5,845,326 A | * | 12/1998 | Hirayama et al. .......... | 711/135 |
| 6,088,773 A | * | 7/2000 | Kano et al. .................. | 711/146 |

FOREIGN PATENT DOCUMENTS

| | | |
|---|---|---|
| DE | 41 36 729 | 5/1992 |
| EP | 0 299 511 | 1/1989 |
| EP | 0 328 172 | 8/1989 |
| EP | 0 750 262 | 12/1996 |
| WO | WO 84/02409 | 6/1984 |

* cited by examiner

Primary Examiner—Reginald G. Bragdon
(74) Attorney, Agent, or Firm—Finnegan, Henderson, Farabow, Garrett & Dunner, L.L.P.

(57) ABSTRACT

Addresses of all of dirty blocks of a cache memory are, by an update address registering section, stored in one of plural regions of an update address memory. When a certain cache block is brought to a dirty state and then suspended from the dirty state, the update address removing section removes the address from the region. When cache flush is performed, a flush executing section sequentially fetches the addresses of the dirty blocks from each region to issue, to the system bus, a command for writing-back data indicated by the address into the main memory so that the contents of all of the a dirty block are written-back into the main memory. Therefore, the cache flush apparatus according to the present invention is able to shorten time required to perform the cache flush procedure and to improve the performance of a computer system having the cache flush apparatus.

67 Claims, 24 Drawing Sheets

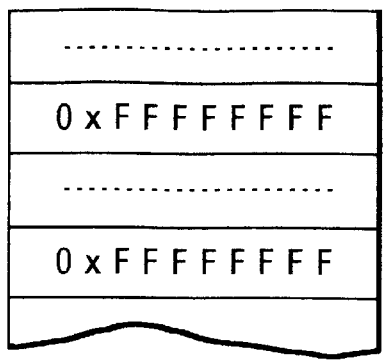
F I G. 2A
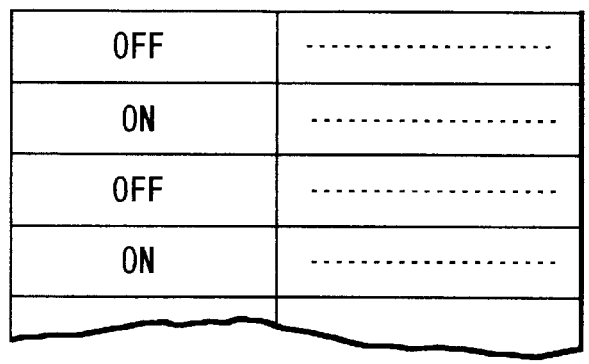
F I G. 2B
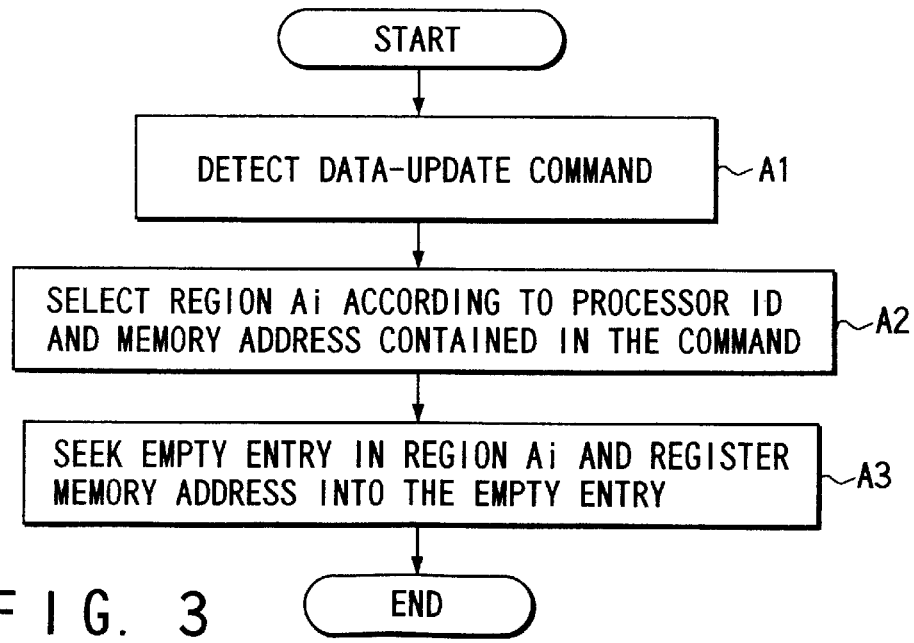
F I G. 3

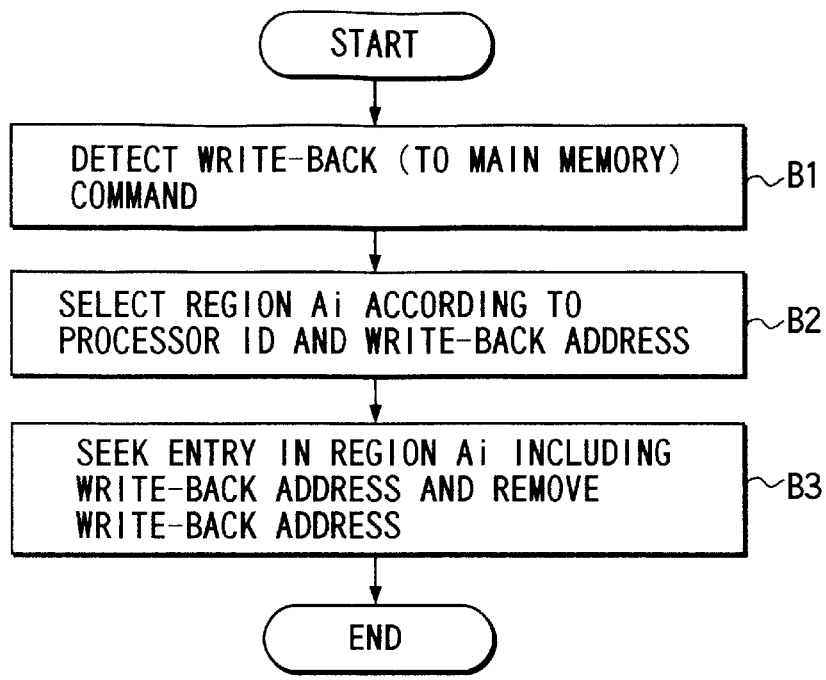
F I G. 4
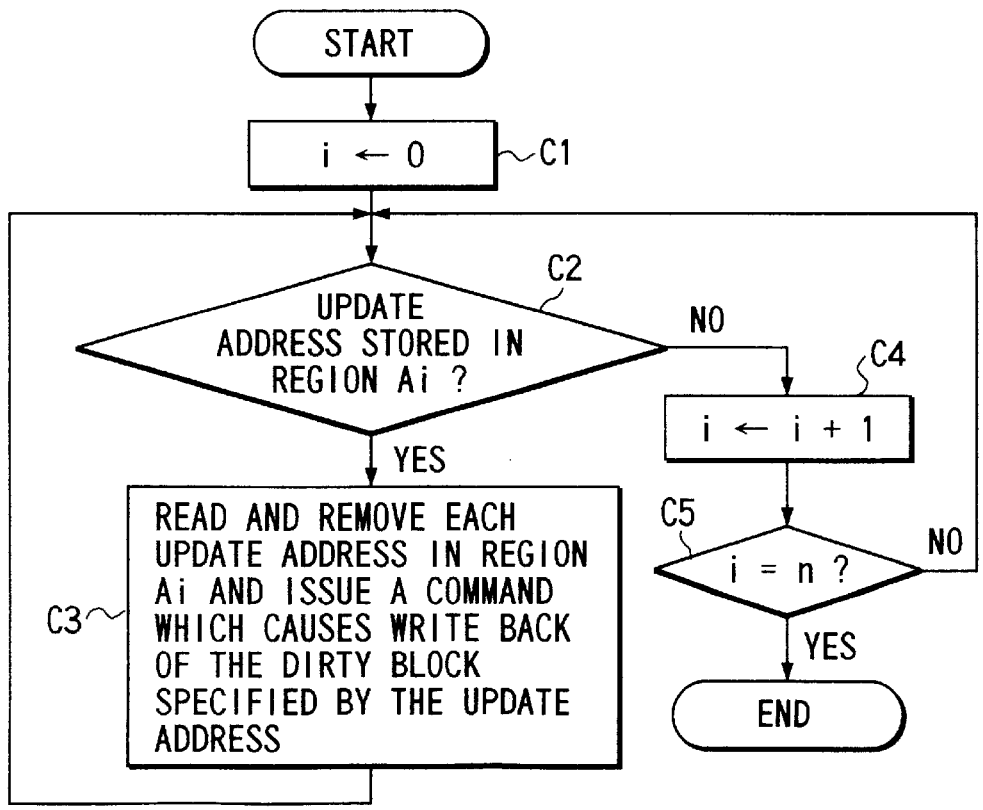
F I G. 5

| | CACHE BLOCK 0 | WRITE BUFFER | SYSTEM BUS | ENTRY OF REGION A0 |
|---|---|---|---|---|
| (1) | | | < UPDATE AT ADDRESS OF 0 > | 0xFFFFFFFF |
| (2) | 0 : D0 | | | 0 |
| (3) | | < WRITE-BACK D0 AT 0 > | < UPDATE AT ADDRESS OF BM > | 0 |
| (4) | BM : D1 | < WRITE-BACK D0 AT 0 > | | BM |
| (5) | | < WRITE-BACK D0 AT 0 ><br>< WRITE-BACK D1 AT BM > | < UPDATE AT ADDRESS OF 2BM > | BM |
| (6) | 2BM : D2 | < WRITE-BACK D0 AT 0 ><br>< WRITE-BACK D1 AT BM > | | 2BM |
| (7) | 2BM : D2 | < WRITE-BACK D1 AT BM > | < WRITE-BACK D0 AT 0 > | 2BM |
| (8) | 2BM : D2 | | < WRITE-BACK D1 AT BM > | 2BM |

F I G. 8

| | CACHE BLOCK 0 | WRITE BUFFER | SYSTEM BUS | REGION A0 | COUNTER |
|---|---|---|---|---|---|
| (1) | | | < UPDATE AT ADDRESS OF 0 > | | 0 |
| (2) | 0 : D0 | | | 0 | 1 |
| (3) | | < WRITE-BACK D0 AT 0 > | < UPDATE AT ADDRESS OF BM > | 0 | 1 |
| (4) | BM : D1 | < WRITE-BACK D0 AT 0 > | | BM | 2 |
| (5) | | < WRITE-BACK D0 AT 0 > <br> < WRITE-BACK D1 AT BM > | < UPDATE AT ADDRESS OF 2BM > | BM | 2 |
| (6) | 2BM : D2 | < WRITE-BACK D0 AT 0 > <br> < WRITE-BACK D1 AT BM > | | 2BM | 3 |
| (7) | 2BM : D2 | < WRITE-BACK D1 AT BM > | < WRITE-BACK D0 AT 0 > | 2BM | 2 |
| (8) | 2BM : D2 | | < WRITE-BACK D1 AT BM > | 2BM | 1 |

F I G. 13

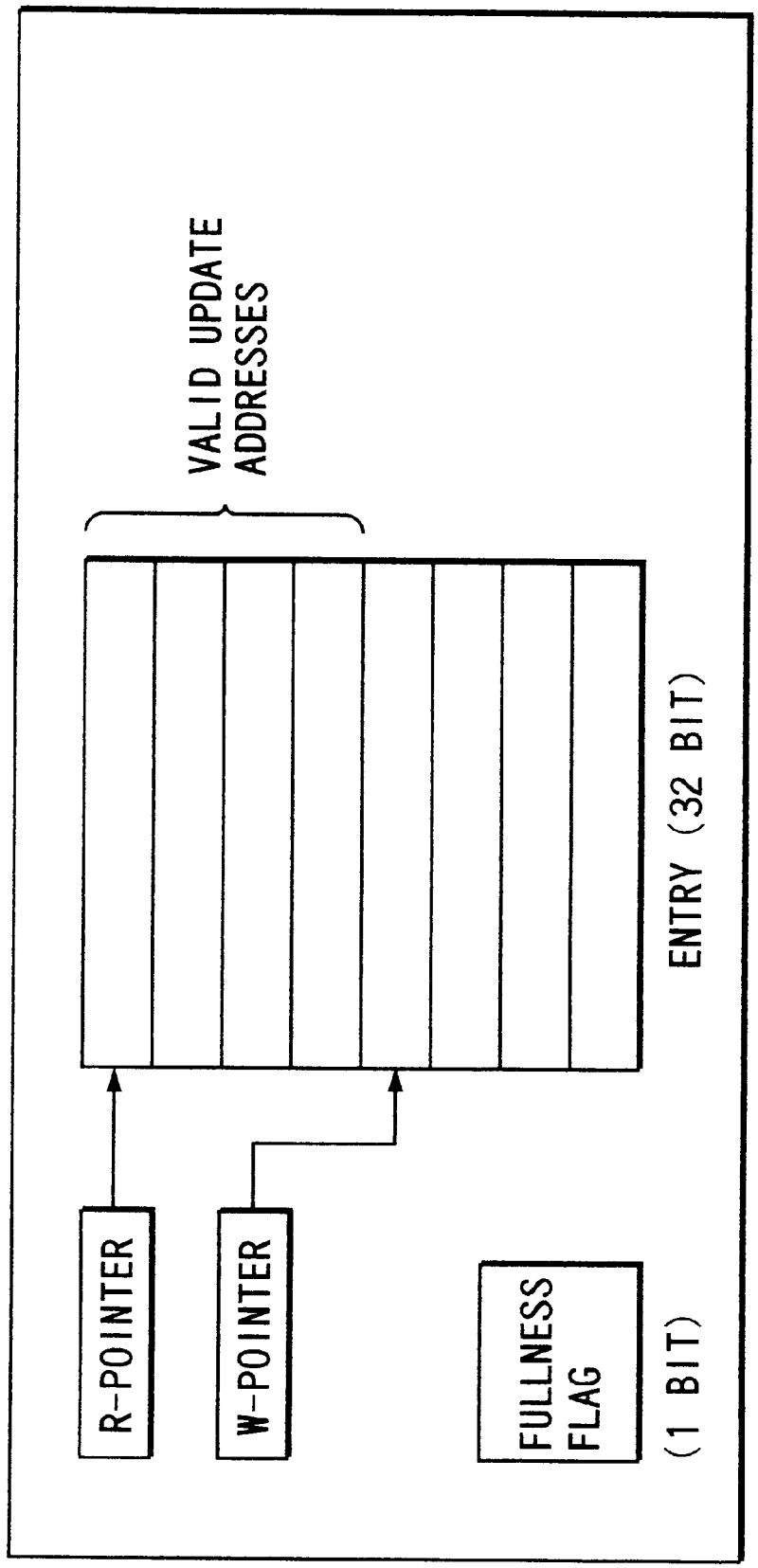
F I G. 17

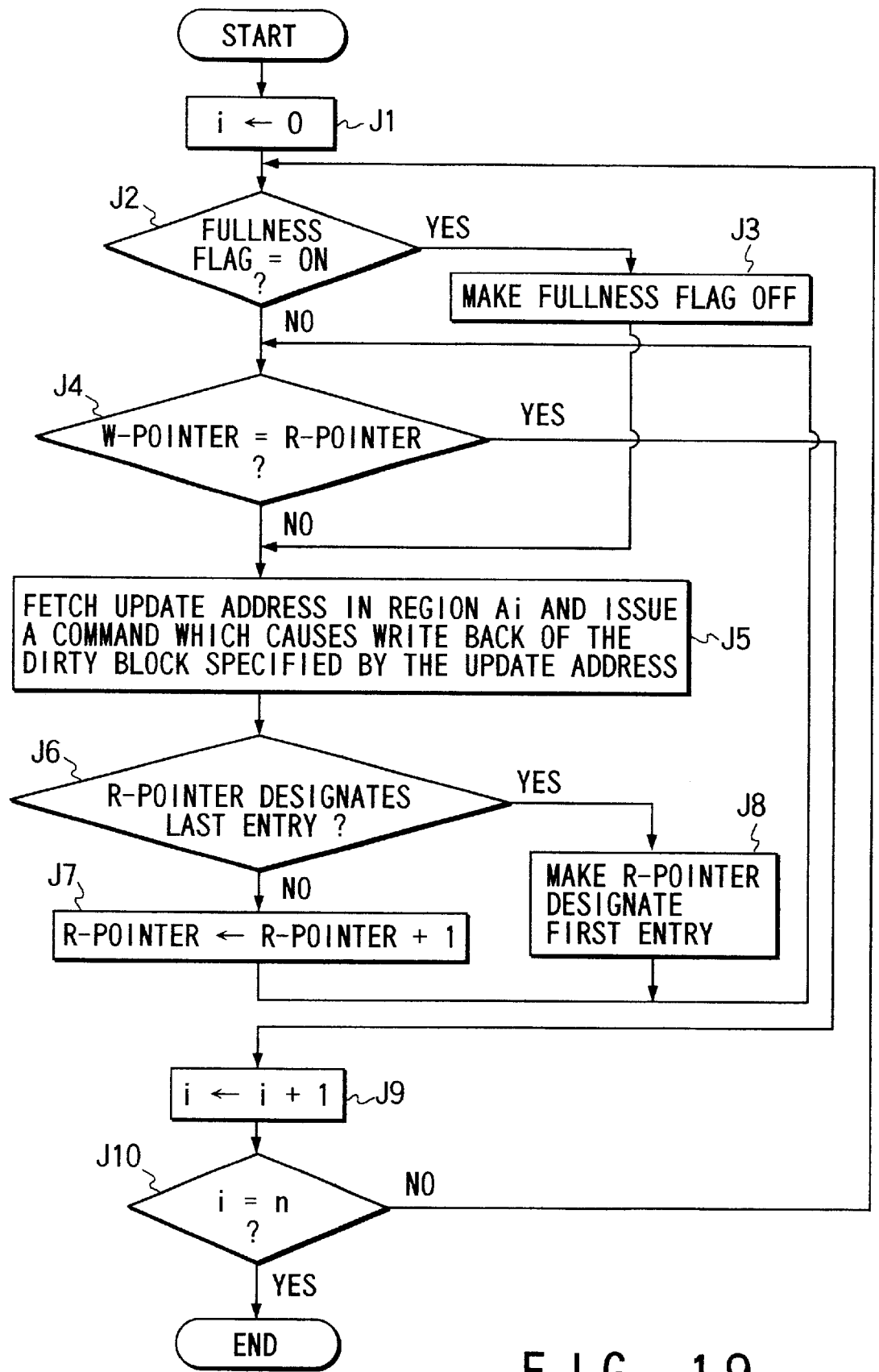
F I G. 19

| | CACHE BLOCK 0 | WRITE BUFFER | SYSTEM BUS | REGION A0 |
|---|---|---|---|---|
| (1) | | | < UPDATE AT ADDRESS OF 0 > | — — |
| (2) | 0 : D0 | | | 0 — |
| (3) | | < WRITE-BACK D0 AT 0 > | < UPDATE AT ADDRESS OF BM > | 0 — |
| (4) | BM : D1 | < WRITE-BACK D0 AT 0 > | | 0 BM |
| (5) | | < WRITE-BACK D0 AT 0 > <br> < WRITE-BACK D1 AT BM > | < UPDATE AT ADDRESS OF 2BM > | 0 BM |
| (6) | 2BM : D2 | < WRITE-BACK D0 AT 0 > <br> < WRITE-BACK D1 AT BM > | | 2BM BM |
| (7) | 2BM : D2 | < WRITE-BACK D1 AT BM > | < WRITE-BACK D0 AT 0 > | 2BM BM |
| (8) | 2BM : D2 | | < WRITE-BACK D1 AT BM > | 2BM BM |
| (9) | 2BM : D2 | | | 2BM BM |

FIG. 20

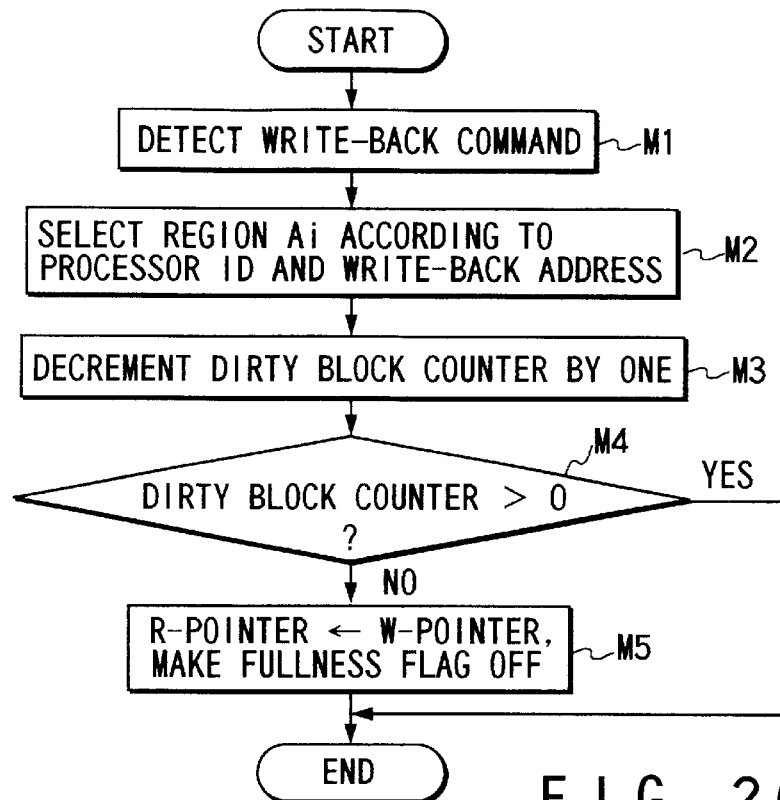
F I G. 26
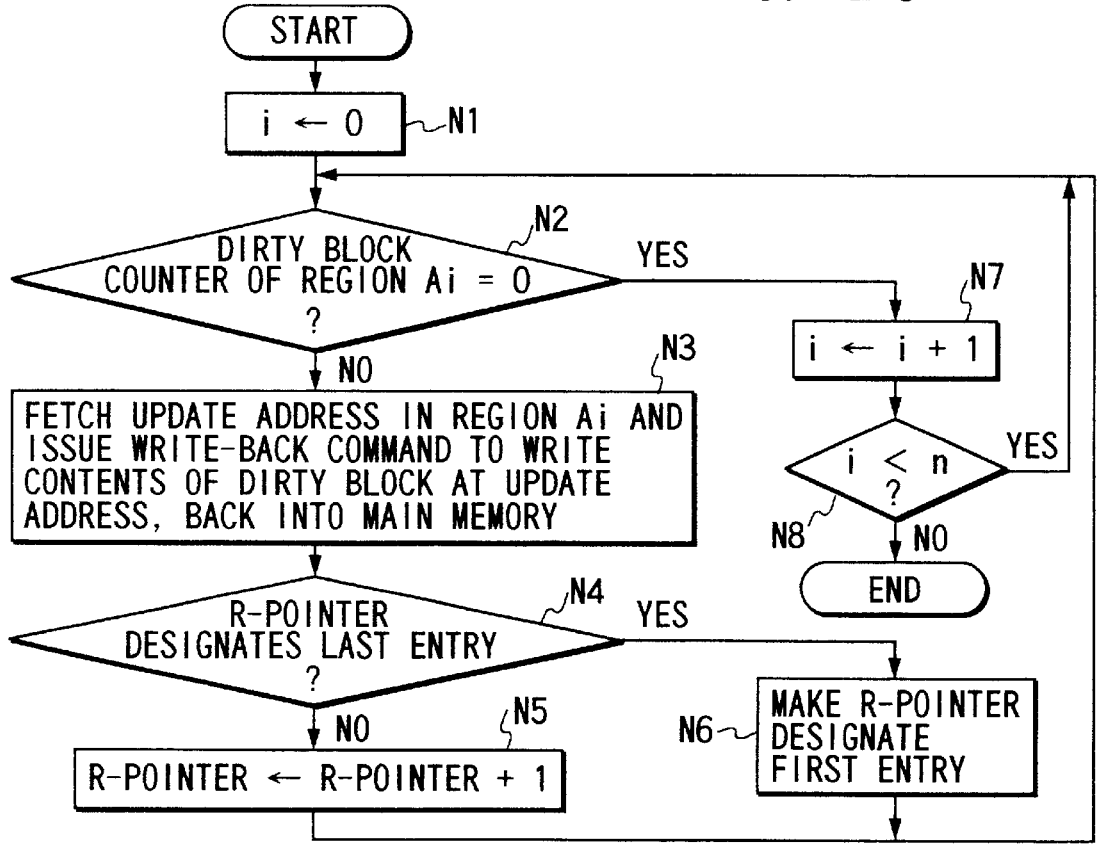
F I G. 27

US 6,490,657 B1

CACHE FLUSH APPARATUS AND COMPUTER SYSTEM HAVING THE SAME

BACKGROUND OF THE INVENTION

This application is based on Japanese Patent Application No. 8-238,157, filed Sep. 9, 1996, the content of which is incorporated herein by reference.

The present invention relates to a cache flush apparatus for a cache memory having a snoop mechanism for maintaining data coherency and a fault tolerant computer system having the cache flush apparatus.

In general, a modern high-speed processor has a cache memory for temporarily holding data required by the processor in order to reduce the effective memory access latency. A cache memory holds data and the memory address at which the data is read out in a fixed size data storage unit called a cache block.

In a computer (more specifically a multi-processor computer) having a plurality of processors each of which has its own cache memory, a snoop mechanism is usually used to maintain data coherency among the cache memories. A snoop mechanism monitors the system bus to detect bus commands and if a bus command which requires some action of the cache memory is detected, the snoop mechanism does the required action such as replying to the bus command with data held in one of its cache blocks, discarding data in one of its cache blocks and the like.

The cache memory is classified into copy-back type and write-through type. While a write-through type cache memory writes back data into the main memory immediately when it is updated within the cache memory, a copy-back type cache memory postpones the write-back of data until it becomes necessary. Therefore, for a copy-back type cache memory, a cache block may hold updated data which has not been written back into the main memory yet. Such a cache block is called a dirty block and the state of such a cache block is called dirty.

A copy-back type cache memory requires a cache flush operation which writes back all the data updated solely within the cache memory into the main memory.

For example, data transfer between an input/output device without a memory coherency mechanism and the main memory requires a cache flush before the data transfer in order to assure that the main memory holds valid data. From now on, a "cache memory" means a copy-back type cache memory.

A cache flush is also necessary for a main memory based checkpoint/rollback type fault tolerant computer. Such a fault tolerant computer periodically creates a checkpoint within its main memory. When the computer detects some faults during the normal data processing, the computer rolls back its internal state to the most recent checkpoint and then restarts the normal data processing.

Since a checkpoint image created within the main memory should contain sufficient information to restart the normal data processing, it is necessary to perform a cache flush as a part of checkpoint creation.

A cache flush is usually performed by using machine instructions provided by the processor.

Intel Pentium™ processor and its successors, for example, provide a "wbinvd" (writeback & invalidate) instruction. The instruction writes back data of all the dirty blocks into the main memory and sets the state of every cache block invalid. Therefore, when a cache flush has been performed by executing the "wbinvd" instruction as a part of checkpoint creation, cache misses occur very frequently during the normal data processing which follows the checkpoint creation.

MIPS R4000™ processor, for example, provides a "secondary cache hit writeback" instruction. The operand of the instruction, different from the case of the "wbinvd" instruction, is a single cache block. The following is a sample program of a cache flush operation.

fcflush

With the foregoing program, "cache 0x1b, 0($4)" is the "secondary cache hit writeback" instruction. The instruction checks the state of the cache block of a secondary cache memory designated by the contents of the fourth register ($4). If the state is dirty, the data of the cache block is written-back into the main memory and the state of the cache block turns "clean-exclusive" or "shared". The loop should be repeated as many as the number of the cache blocks of the secondary cache memory even if the number of dirty blocks is small. It should be mentioned that the execution time of a cache instruction is usually much longer than that of an ordinary instruction such as an arithmetic instruction.

SPARC V9™ processor does not provide any instruction for a cache flush. If a cache flush is necessary, a load instruction should be used so that the data within a dirty block is replaced by the data newly loaded into the cache block. Therefore, the inefficiency of a cache flush is apparently more critical than the case of Intel Pentium processor.

To accelerate a cache flush operation has been a concern for designers of a main memory based checkpointrol/back type fault-tolerant computer. Japanese patent disclosure (KOKAI) No. 5-6308, "Cache controller, fault tolerant computer and data transfer method", Mitsubishi Denki Co. Ltd., proposed a cache controller with additional memory for storing the memory address at which a piece of data is updated. In a cache flush operation, while a conventional cache controller checks the state of every cache block and, if it is dirty, writes back the data held in the cache block, the proposed cache controller can use the addresses stored in the additional memory effectively. However, this method has a critical disadvantage that it requires a major modification of the present cache controller design, which is too costly.

BRIEF SUMMARY OF THE INVENTION

In view of the foregoing, the primary object of the present invention is to provide a cache flush apparatus applicable to a variety of commercial high speed microprocessors having cache memories. The cache flush apparatus, attached to the system bus, maintains the memory addresses held in dirty blocks within its own storage during the normal data processing. When a cache flush is required, the cache flush apparatus reads the memory addresses from the storage efficiently and issues bus commands each of which requires to write back data held in one of the dirty blocks. As a result, a dirty block becomes "shared" and it still holds the same data. For a non-dirty cache block, it remains unchanged.

According to a first aspect of the present invention, there is provided a cache flush apparatus for use in a computer having at least one processor provided with a copy-back type cache memory having a bus snoop mechanism, a main memory and a system bus for connecting the at least one processor and the main memory, the cache flush apparatus comprising:

update address registering means for monitoring the system bus to detect an update of data within the cache memory, selecting a region of the update address storage means according to a memory address MU at which the data has been updated and an identifier of a processor which has updated the data and storing the memory address MU as an update address in one of the entries of the selected region;

update address removing means for monitoring the system bus to detect a write-back of data from a dirty block, selecting a region of the update address storage means according to a memory address MW at which the data has been written back and an identifier of a processor from which the data has been written back, and removing the update address which is equal to the memory address MW and is stored in an entry of the selected region; and flush executing means, in response to a request from the at least one processor, for issuing bus commands to the system bus each of which has one of the update addresses UA stored in the update address storage means and causes a write-back of data from the dirty block designated by the update address UA.

According to the first aspect of the present invention, the address of data held in a dirty block is stored in an entry of the selected region of the update address storage means. When a processor updates some data and as a result the state of a cache block turns dirty, the memory address MU is captured and stored in an empty entry of the selected region of the update address storage means. When a write-back of data from a dirty block occurs (which means the state of the cache block turns "shared"), the update address is removed from the update address storage means. The reason why the update address storage means is divided into regions and the update address registering means and the update address removing means select a region is that the removal operation can be accelerated by reducing the number of entries which must be examined.

The flush executing means, reading out all the update addresses from the update address storage means, issues bus commands to the system bus each of which has one of the update addresses UA and requires write-back of data from the dirty block designated by the update address UA.

As a result, the cache flush apparatus causes write-back of all the data from the dirty blocks and changes the state of the dirty blocks to some state other than invalid (typically "shared") and does not affect the other cache blocks.

According to a second aspect of the present invention, there is provided a cache flush apparatus for use in a computer having at least one processor provided with a copy-back type and direct map cache memory having a bus snoop mechanism, a main memory and a system bus for connecting the at least one processor and the main memory, the cache flush apparatus comprising:

update address storage means having a plurality of regions each of which corresponds to a cache block and has one entry for storing the memory address of data held in the corresponding cache block if the cache block's state is dirty;

update address registering means for monitoring the system bus to detect an update of data within the cache memory, selecting a region of the update address storage means according to a memory address MU at which the data has been updated and an identifier of a processor which has updated the data and storing the memory address MU as an update address in the entry of the selected region;

update address removing means for monitoring the system bus to detect a write-back of data from a dirty block, selecting a region of the update address storage means according to a memory address MW at which the data has been written back and an Washin identifier of a processor from which the data has been written back, comparing the update address stored in the entry of the selected region with the memory address MW, and if they are the same, removing the update address from the entry; and flush executing means, in response to a request from the at least one processor, for issuing bus commands to the system bus each of which has the update address UA stored in the entry of a region and causes a write-back of data from the dirty block designated by the update address UA.

According to the second aspect of the present invention, the cache flush apparatus can, in an efficient way, cope with a case where each processor has a write buffer. A write buffer is a hardware module equipped between a processor (including cache memory) and a system bus and holds several bus commands for write requests when the system bus is busy.

In this case, it appears to the cache flush apparatus as if a cache block could hold more than one dirty pieces of data.

To cope with this case, each region, assigned to one of the cache blocks, consists of an entry for storing the memory address of the latest data update relating to the cache block. When a write-back of data is detected by the update address removing means, the update address stored in the entry of the selected region and the memory address of the writeback are compared. If they are the same, the update address is removed from the entry.

According to a third aspect of the present invention, there is provided a cache flush apparatus for use in a computer having at least one processor provided with a copy-back type and direct map cache memory having a bus snoop mechanism, a main memory and a system bus for connecting the at least one processor and the main memory, the cache flush apparatus comprising update address storage means having a plurality of regions each of which corresponds to a cache block and has one counter and one entry for storing the memory address of data held in the corresponding cache block if the cache block's state is dirty;

update address registering means for monitoring the system bus to detect an update of data within the cache memory, selecting a region of the update address storage means according to a memory address MU at which the data has been updated and an identifier of a processor which has updated the data, storing the memory address MU as an update address in the entry of the selected region, and incrementing the counter of the selected region;

update address removing means for monitoring the system bus to detect a write-back of data from a dirty block, selecting a region of the update address storage means according to a memory address MW at which the data has been written back and an identifier of a processor from which the data has been written back, and decrementing the counter of the selected region; and flush executing means, in response to a request from the at least one processor, for issuing bus commands to the system bus each of which has the update address UA stored in the entry of a region with a non-initial counter value and causes a write-back of data from the dirty block designated by the update address UA.

According to the third aspect of the present invention, the cache flush apparatus can, like the second aspect, cope with a case where a processor has a write buffer.

To cope with this case, each region, corresponding to one of the cache blocks, consists of one counter and one entry. The update address registering means increments the counter when an update address is stored in the entry of the corresponding region. The update address removing means decrements the counter when a write-back of data from the corresponding cache block is detected. Therefore a counter holds the number of updated pieces of data which exist within the write buffer and the cache memory and correspond to the cache block. The flush execution means determines that an entry has a valid update address if the associated counter has a non-initial value.

For most computer systems, "read-line" is a bus command which causes a write-back of data from a dirty block. However, there are computer systems where no bus command is provided which requests a write-back of data into the main memory.

In this case, it is effective to provide a data path which enables the processor to read out the update addresses from the update address storage means. Then the processor, reading out each update address, executes a cache block write-back instruction for a dirty block or a load instruction which requests a data replacement from a dirty block.

According to a fourth aspect of the present invention, there is provided a cache flush apparatus for use in a computer having at least one processor provided with a copy-back type cache memory having a bus snoop mechanism, a main memory and a system bus for connecting the at least one processor and the main memory, the cache flush apparatus comprising:

update address storage means having a plurality of regions each of which has one or more entries for storing the addresses of data held in dirty blocks;

update address registering means for monitoring the system bus to detect an update of data within the cache memory, selecting a region of the update address storage means according to a memory address MU at which the data has been updated and an identifier of a processor which has updated the data, selecting an entry of the selected region, if the selected entry has an update address UA, issuing a bus command which cause a write back of data from the cache block designated by the update address UA, and storing the memory address MU as an update address in the selected entry; and flush executing means, in response to a request from the at least one processor, for issuing bus commands to the system bus each of which has one of the update addresses UA stored in the update address storage means and causes a write-back of data from the dirty block designated by the update address UA.

According to the fourth aspect of the present invention, the cache flush apparatus, with reasonable amount of hardware, can cope with a case where a processor has a non-direct-map cache memory as well.

Comparing the fourth aspect with the first aspect, the update address registering means of the fourth aspect is more complicated but the update address removing means is omitted.

Before explaining the fourth aspect, suppose a case where a cache flush apparatus of the first aspect is applied to a processor having a four-way set associative cache memory.

Since a region is selected according to the memory address and the processor identifier and a piece of updated data exists in one of the four cache blocks from the same way, a region must consists of at least four entries.

When a write-back of data is detected, the update address removing means has to examine the four entries to find out the entry having the specified update address. If the processor has a write buffer, the cache flush apparatus would be much more complicated. Thus the cache flush apparatus of the first aspect would be as complicated as the cache controller in case of a non-direct-map cache memory.

According to the fourth aspect, by augmenting the function of the update address registering means, the update address removing means of the first aspect can be omitted.

Since a cache flush apparatus of the fourth aspect does not have an update address removing means, when a dirty block writes back its data, the update address is not removed from the update address storage means.

When an update of data is detected by the update address registering means, it selects a region according to the memory address MU and the processor identifier. And then it selects an entry of the region. If the selected entry holds an update address UA, the update address registering means issues a bus command which causes a write-back of data stored in the dirty block designated by the update address UA. If the designated dirty block exists, the dirty block writes back its data. Otherwise the bus command is ignored. Then, the update address registering means stores the memory address MU as an update address in the entry.

Thus, the update address registering means of the fourth aspect, different from that of the first aspect, changes the state of a cache block by issuing a bus command in order to assure that when an update address is removed from the update address storage means, the corresponding dirty block (if any) writes back its data at the same time.

In addition to the advantage of easier adaptation to a non-direct-map cache memory, there are other advantages about mapping the regions of the update address storage means to the cache memory configuration.

It is possible to organize the update address storage means as a single region which would omit the region selection mechanism of the update address registering means.

It is also possible to reduce the number of entries of a region. For example, it is reasonable that each region of the update address storage means applied to a four-way set associative cache memory has only two entries. This is because it does not happen frequently that over one half of the cache blocks belonging to the same way hold dirty data at the same time.

It should be noted, however, an oversimplified hardware implementation of the update address storage means would bring a critical performance degradation because of increasing the number of bus commands issued by the update address storage means.

It is also possible that a region of the update address storage means is selected only according to the memory address MU at which the data has been updated (the processor identifier is not used).

According to a fifth aspect of the present invention, there is provided a cache flush apparatus for use in a computer having at least one processor provided with a copy-back type cache memory having a bus snoop mechanism, a main memory and a system bus for connecting the at least one processor and the main memory, the cache flush apparatus comprising:

update address storage means having a plurality of regions each of which has one or more entries for storing the addresses of data held in dirty blocks;

update address registering means for monitoring the system bus to detect an update of data within the cache memory, selecting a region of the update address storage means according to a memory address, MU at which the data has been updated and an identifier of a processor which has updated the data, selecting an entry of the selected region, if the selected entry has an update address UA, issuing a bus command which cause a write back of data from the cache block designated by the update address UA, and storing the memory address MU as an update address in the selected entry;

update address removing means for monitoring the system bus to detect a write-back of data from a dirty block, selecting a region of the update address storage means according to a memory address MW at which the data has been written back and an identifier of a processor from which the data has been written back, trying to remove the update address which is equal to the memory address MW from an entry of the selected region for a predetermined time; and flush executing means, in response to a request from the at least one processor, for issuing bus commands to the system bus each of which has one of the update addresses stored in the update address storage means and causes a write-back of data from the dirty block designated by the update address.

According to the fifth aspect of the present invention, the update address removing means selects a region and tries to find out an entry of the region having the update address which is equal to the memory address MW for a predetermined period. If it is successful, the cache flush apparatus behaves like that of the first aspect. Otherwise, the update address would remain in the update address storage means and the update address registering means will work well like that of the fourth aspect.

To compare the fifth aspect and the fourth aspect, the fifth aspect has an advantage that the number of bus commands issued by the update address registering means is reduced on behalf of the update address removing means.

It is preferable that the update address removing means continues searching of the selected region until a next bus command to be processed is detected, not until a predetermined time period passes.

Other than data write-back bus commands, there is another kind of bus commands which show there is no dirty block having a certain memory address. For example, suppose a cache memory issues a "read-line" bus command and there is no response from the other cache memories. The request/response pair indicates that there is no dirty block having the memory address included in the "read-line" bus command. Thus, the update address removing means of the fourth and the fifth aspect, detecting such request/response pair, can do the same operation as in the case of a data write-back bus command.

According to a sixth aspect of the present invention, there is provided a cache flush apparatus according to the fourth aspect, in which each region of the update address storage means has a dirty block counter for counting the number of dirty blocks corresponding to the region; and the update address registering means has means for incrementing the dirty block counter of the selected region when an update of data within a cache memory is detected, and characterized by further comprising:

decrement means for monitoring the system bus to detect a write-back of data from a dirty block, selecting a region of the update address storage means according to the memory address MW at which the data has been written back and the processor identifier from which the date has been written back, and decrementing the dirty block counter of the selected region; and entry reclaiming means, when the value of a dirty block counter is decremented to the initial value, for making all the entries of the selected region empty.

According to the sixth aspect of the present invention, the dirty block counter of each region is properly maintained so that it indicates the exact number of dirty blocks corresponding to the region. Thus, when the dirty block counter of a region is decremented to the initial value, there is no dirty block corresponding to the region and so the update addresses can be removed from all the entries of the region (if any).

For the sake of the dirty block counter and entry reclaiming means, the number of bus commands issued by the update address registering means is reduced.

According to a seventh aspect of the present invention, there is provided a cache flush apparatus according to the fifth aspect, in which each region of the update address storage means includes a dirty block counter for counting the number of dirty blocks corresponding to the region;

the update address registering means has means for incrementing the dirty block counter of the selected regions;

the update address removing means has means for decrementing the dirty block counter of the selected region, and characterized by further comprising:

entry reclaiming means, when the value of a dirty block counter is decremented to the initial value, for making all the entries of the selected region empty.

According to the seventh aspect of the present invention, the dirty block counter of each region is properly maintained as in the sixth aspect case.

According to an eighth aspect of the present invention, there is provided a fault-tolerant computer system having processors provided with a copy-back type cache memory having a bus snoop mechanism, a main memory and a system bus for connecting the processors and the main memory and arranged to periodically create a checkpoint within the main memory, comprising:

a cache flush apparatus according to either of the first to the seventh aspects;

normal data processing step where a processor performs normal data processing with the update address registering means of the cache flush apparatus running;

checkpoint creating step where the processor creates a checkpoint in the main memory by writing the context of the processor and activating the flush executing means; and.

rollback & recovery means where, when a fault occurs and the computer can not continue normal data processing step or checkpoint creating step any more, the processor rolls back the main memory to the state of the most recent checkpoint and restarts the normal data processing step.

A main memory based checkpoint/rollback type fault tolerant computer periodically creates a checkpoint in its main memory. The flush executing means of the cache flush apparatus accelerates a cache flush and advantageously the state of the cache blocks remains valid. Therefore a main memory based checkpoint/rollback type fault tolerant computer with the cache flush apparatus thereof increases the system performance considerably.

In addition to the above computer system for periodically acquiring checkpoints, the cache flush apparatus according to the present invention can be applied to a duplex computer system in which the primary computer alternately continues normal data processing and sends its checkpoint image to the secondary computer and when a fault occurs within the primary computer, the secondary computers takes over the normal data processing. The cache flush means of the cache flush apparatus accelerates the checkpoint creation of the primary computer.

Additional objects and advantages of the present invention will be set forth in the description which follows, and in part will be obvious from the description, or may be learned by practice of the present invention.

The objects and advantages of the present invention may be realized and identified by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 2A and 2B are conceptual views showing the structure of a region Ai of the update address memory of the first embodiment;

FIG. 3 is an operation diagram of the update address registering section of the first embodiment;

FIG. 4 is an operation diagram of the update address removing section of the first embodiment;

FIG. 5 is an operation diagram of the flush executing section of the first embodiment;

FIG. 8 shows a table representing the operation which is performed when the processor of the first embodiment continuously writes data D0, D1 and D2 at addresses 0, B×M and 2B×M;

FIG. 13 shows a table representing the operation which is performed when the processor of the modification continuously writes data D0, D1 and D2 to addresses 0, B×M and 2B×M;

FIG. 17 is a conceptual view showing the structure of the region of the update address memory of the second embodiment;

FIG. 19 is an operation diagram of the flush execution section of the second embodiment;

FIG. 20 is a table showing the operation which is performed when the processor of the second embodiment continuously writes data D0, D1 and D2 to addresses 0, B×M and 2B×M;

FIG. 26 is an operation diagram of the update address removing section of the fourth embodiment;

FIG. 27 is an operation diagram of the flush execution section of the fourth embodiment;

DETAILED DESCRIPTION OF THE INVENTION

A preferred embodiment of a computer system having a cache flush apparatus according to the present invention will now be described with reference to the accompanying drawings.

(First Embodiment)

Figure 1:
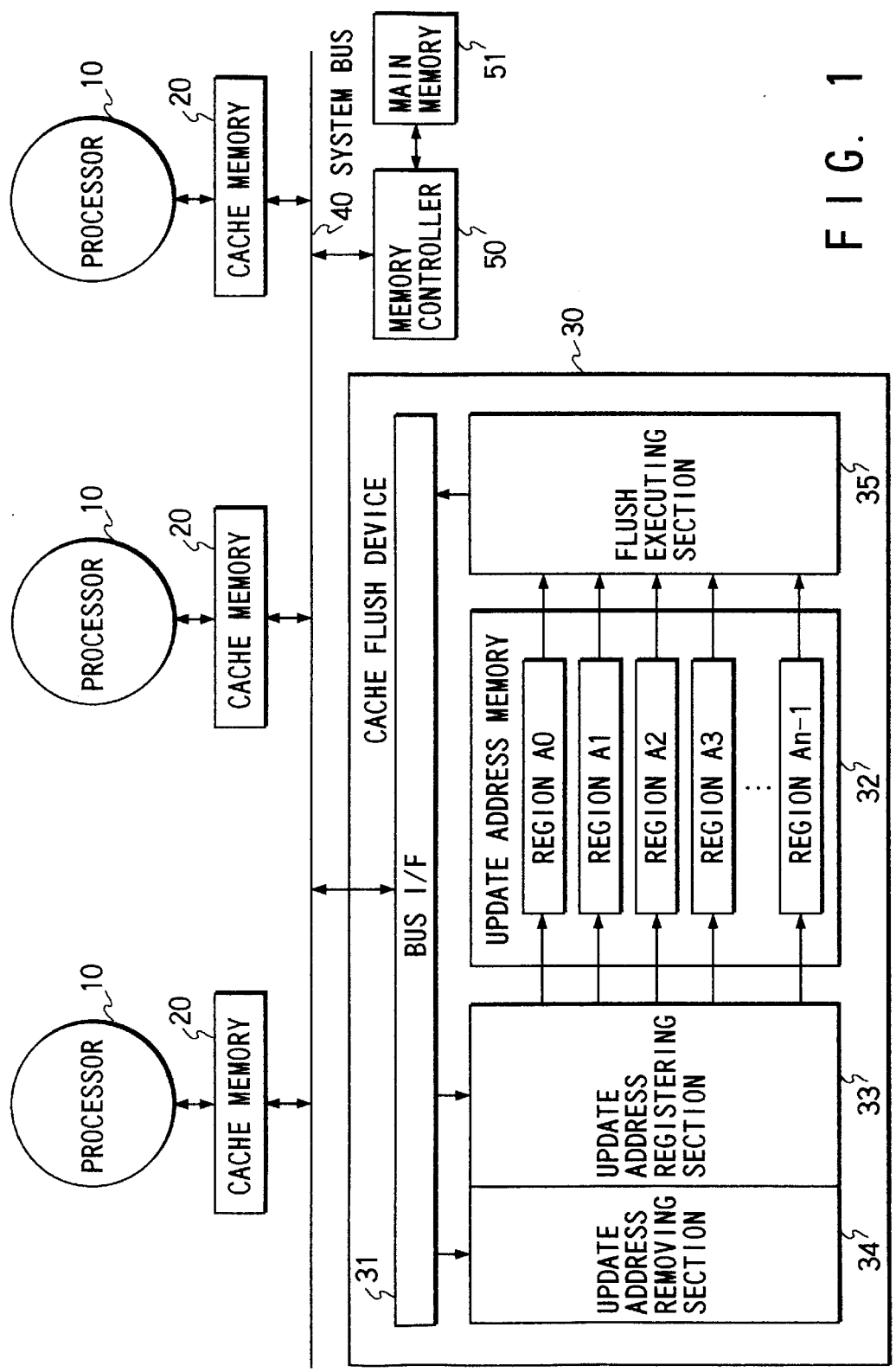
FIG. 1 is a block diagram showing the configuration of a computer system according to the first embodiment of the present invention.

FIG. 1 is a block diagram showing the configuration of a computer system according to the first embodiment of the present invention. Each processor 10 has its own copy-back type cache memory 20 with a cache coherency mechanism and is connected to a system bus 40. In a case where the configuration of the cache memory 20 is two level (namely comprises primary and secondary cache memories) or more, the cache memory according to this embodiment means the cache memory nearest to the system bus 40. In case where a cache memory comprises an instruction cache memory and a data cache memory, the cache memory according to this embodiment means the data cache memory. The system bus 40 according to this embodiment has 32 bit width.

A cache flush device 30 and a memory controller 50 for a main memory 51, are connected to the system bus 40. The cache flush device 30 includes a system bus interface 31, an update address memory 32 (consisting of regions $A_0$ to $A_{n-1}$), an update address registering section 33, an update address removing section 34 and a flush executing section 35. The update address registering section 33 and the update address removing section 34 can be implemented as a single hardware module.

The system bus interface 31 serves as an interface with the system bus 40.

The update address memory 32 consists of n regions $A_0$ to $A_{n-1}$ for storing addresses of data held in the dirty blocks of the cache memories 20. In this embodiment, if and only if a dirty block holds data of a certain address, the address is stored in a certain region of the update address memory 32. From now on, we call such a memory address stored in the update address memory 32 an update address.

The structure of a region of the update address memory 32 will now be described. As shown in FIG. 2A and FIG. 2B, a region Ai has one or more entries each of which can store an update address. To indicate whether or not an entry has an update address, either of the following methods is employed.

An exceptional value (for example, 0xFFFFFFFF) is used to indicate the entry does not have an update address. (see FIG. 2A).

A flag is attached to each entry and when an entry holds no update address, the corresponding flag is set on. (see FIG. 2B).

The method of determining how many regions the update address memory should have and the method of mapping each region to the memory address space will be described later.

FIG. 3 shows the operation diagram of the update address registering section 33. When a processor 10 updates a piece of data within a cache memory 20, the cache memory 20 issues a bus command on the system bus 40. The system bus interface 31 detects the bus command and transfers it to the update address registering section 33 (step A1). The update address registering section 33 selects a region $A_i$ from the regions $A_0$ to $A_{n-1}$ according to the memory address MU at which the data is updated and the processor identifier (ID) which has updated the data (step A2). The update address registering section 33 finds out an empty entry of the region Ai, and stores the memory address MU as an update address in the empty entry (step A3).

The memory address MU is included in the bus command. The processor identifier can be acquired by either of the following two methods depending on the specification of the system bus 40; 1) by extracting the identifier from the bus command; 2) by monitoring some signal lines of the system bus 40 used for bus arbitration.

FIG. 4 shows the operation diagram of the update address removing section 34. When a write back of data from a dirty block occurs, the cache memory 20 issues a bus command on the system bus 40. The system bus interface 31 detects the bus command and transfers it to the update address removing section 34 (step B1). The update address removing section 34 selects a region from the regions $A_0$ to $A_{n-1}$ according to the memory address MW at which the data has been written back and the processor identifier from which the data has been written back (step B2). Then, the update address removing section 34 finds out the entry having the update address equal to the memory address MW and removes the update address from the entry (step B3).

The update address registering section 33 and the update address removing section 34 must select a region in the same way. The reason why the update address memory 32 consists of n regions and the both sections 33 and 34 select a region in the same way is that the operation of the update address removing section 34 can be accelerated by reducing the number of entries which must be examined.

The flush executing section 35, receiving a request from one of the processors 10, reads and removes every update address from the update address memory 32 and issues a bus command which causes a write-back of data from the dirty block having the update address until all the update addresses are removed.

FIG. 5 shows the operation diagram of the flush executing section 35. In FIG. 5, the flush executing section 35 initializes the variable i to zero (step C1). If the region Ai (the region indicated by i) contains no update address (NO of step C2), the flush executing section 35 increments the variable i by one (step C4). Otherwise (YES of step C2), the flush executing section 35 reads and removes every update address from the region Ai and issues a bus command which causes a write-back of data from the dirty block having the update address (step C3). Then, the operation returns to step C2.

The flush executing section 35 terminates the operation when the variable i becomes equal to n (Yes of step C5).

In the above description, an update address is removed by the flush executing section 35. However, it is also possible for the update removing section 34 to remove the update address by detecting the bus command issued by the flush executing section 35.

Then, how the cache flush device 30 according to the first embodiment is used in the computer system will now be described.

(Initialization)

The processors 10, prior to activating the cache flush device 30, initialize the update address memory 32 and the cache memories so that they are in a consistent state. More specifically, one of the processors 10 clears all the entries of the update address memory 32 and every processor 10 invalidates all the cache blocks of its own cache memory by executing its proper machine instructions.

(During the Normal Operation)

After the initialization, the update address registering section 33 and the update address removing section 34 begin to perform the operations described above so that the update address memory 32 stores the addresses of data held in the dirty blocks of the cache memories 20. On the contrary, for every update address stored in the update address memory 32, there exists a corresponding dirty block. The reason will now be described.

Let us assume that the state of the cache memories and the state of the update address memory are consistent and the processor 10-1 is going to update the data of memory address MU. After the update of data, it will be explained that the state of the cache memories and the state of the update address memory will remain consistent after the data update.

(1) In a case where the cache memory 20-1 has no data of memory address MU;

The cache memory 20-1 issues a bus command which requests to send the data of memory address MU and to invalidate the cache blocks of the other cache memories 20-2, 20-3 which hold the data of memory address MU.

When the data is supplied to the cache memory 20-1, the cache block selected by the cache controller (not shown) according to the memory address MU stores the data and the cache block is changed to a dirty block.

The update address registering section 33 receives the foregoing bus command through the system bus interface 31 and selects one of the regions $A_0$ to $A_{n-1}$ according to the memory address MU and the processor identifier 10-1 and finds out an empty entry and stores the memory address MU in the entry.

(2) In a case where the cache memory 20-1 has the data of address MU in shared state;

The cache memory 20-1 issues a bus command which requests to invalidate the cache blocks of the other cache memories 20-2, 20-3 which hold the data of memory address MU.

When an acknowledgment for the foregoing bus command is replied to the cache memory 20-1, the cache block which holds the data is changed to a dirty block.

The update address registering section 33 receives the foregoing bus command through the system bus interface 31 and selects one of the regions $A_0$ to $A_{n-1}$ according to the memory address MU and the processor identifier 10-1 and finds out an empty entry and stores the memory address MU in the entry.

(3) In a case where the cache memory 20 has data to be updated in dirty state;

The cache memory 20-1 issues no bus command and thus the cache flush device 30 does not perform any operation. However, no problem arises because the memory address MU has been already stored in one of the regions $A_0$ to $A_{n-1}$.

In the above description, it is assumed that a cache block may have three states "invalid", "shared", and "dirty". However, since there are some cache memories which have four states "invalid", "shared", "dirty", and "clean exclusive", it is now described how to apply the cache flush device to such a cache memory.

"Clean exclusive" means that the cache block has a valid and unchanged data exclusively (not shared by any one of the other cache memories). When the processor 10-1 is going to update the data of a "clean exclusive" cache block, the cache block is changed to a dirty block without issuing any bus command. Therefore, the cache flush device of the present invention would fail in detecting the update of data. So, it is necessary to prevent a cache block from becoming "clean exclusive". For this purpose, when a processor is going to read data and a cache miss occurs, the bus interface 31 should make a shared reply. As a result, the state of the cache block becomes "shared" instead of "clean exclusive".

When the data of a dirty block is written-back to memory address MW of the main memory 51, the update address removing section 34 detects the bus command and selects one of the regions $A_0$ to $A_{n-1}$ in the same way as in the update address registering section 33 so that the region which contains the memory address MW is selected. Then the update address removing section 34 finds the entry whose update address is equal to the memory address MW.

When the flush executing section 35 completes the cache flush procedure, there are no dirty cache blocks in the cache memories 20 and there are no update/addresses in the update address memory 32, the same state as when the initialization is completed.

Though there are various possible ways of configuring the regions of the update address memory 32, it is preferable to determine the configuration according to the major aspects of the cache memory configuration, e.g. the number of processors, the number of cache blocks, and direct map or set associative.

(1. Preferable configuration for a direct-map cache memory without a write buffer)

The size of a cache block is denoted to be B bytes and the number of the cache blocks is denoted to be M. In this case, data at the memory address A is stored in the $((A/B) \bmod M)_{th}$ cache block.

It is preferable to establish one to one correspondence between a cache block and a region. So the number of the regions should be M×P where P is the number of the processors and each region should have one entry. The update address registering section 33 and the update address removing section 34 should select the ((A/B) mod M)×PID, where A is the memory address contained in the bus command and PID is the processor identifier. It should be noted that if the number of the processor is one, the above formula will not need to contain the processor identifier.

The update address registering section 33 does not have to find out an empty entry because the selected region has only one entry which is certain to be empty.

The update address removing section 34 can remove the update address without checking whether the update address within the entry of the selected region is equal to the memory address A.

(2. Preferable configuration for a direct-map cache memory with a write buffer)

The write buffer of a recent high performance processor requires a more complicated cache flush device of the present invention. When a processor with a write buffer is going to update data of memory address A and the corresponding cache block C happens to hold data of memory address B in dirty state, a data replacement occurs in the following sequence;

(1) A write-line bus command for data of memory address B is created and temporarily stored in the write buffer.

(2) A read-line-and-invalidate bus command for data of memory address A is issued on the system bus 40.

(3) The data of memory address A is supplied to the cache block C as a reply for the bus command.

(4) The write-line bus command suspended in the write-buffer is issued on the system bus 40 and the data is written back to the main memory.

Therefore, between step (2) and step (4), the cache block C appears to hold both data of memory address A and data of memory address B. Although a naive possible configuration of a cache flush device is to increase the number of the entries of each region, the following problems would arise:

(1) The quantity of the hardware is enlarged.

(2) The performance of the update address removing section is slower because the number of the entries to be searched increases.

For a direct map cache memory with a write buffer, there are two efficient ways of configuring a cache flush device.

(Configuration 2-A)

The configuration of the update address memory 32 is the same as in the preferable configuration for a direct-map cache memory without a write buffer.

Figure 6:
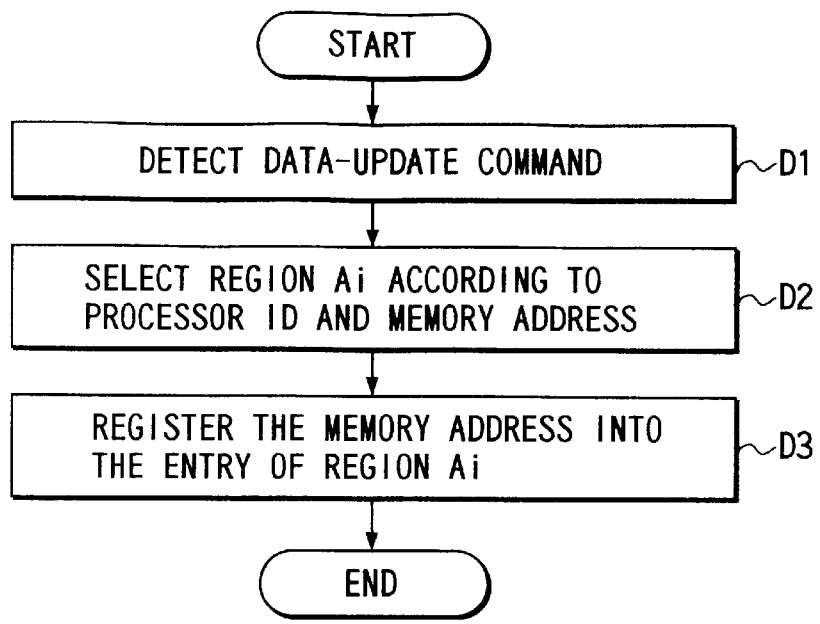
FIG. 6 is an operation diagram of the update address registering section of the second embodiment.

The operation of the update address registering section 33, as is depicted in FIG. 6 is the same. However it should be noted that when memory address MU is going to be stored in the entry of the selected region (D3), it sometimes happens that the entry already has a valid updated address because of the write buffer. Even if it is the case, the update address registering section 33 simply overwrites the memory address MU into the entry.

Figure 7:
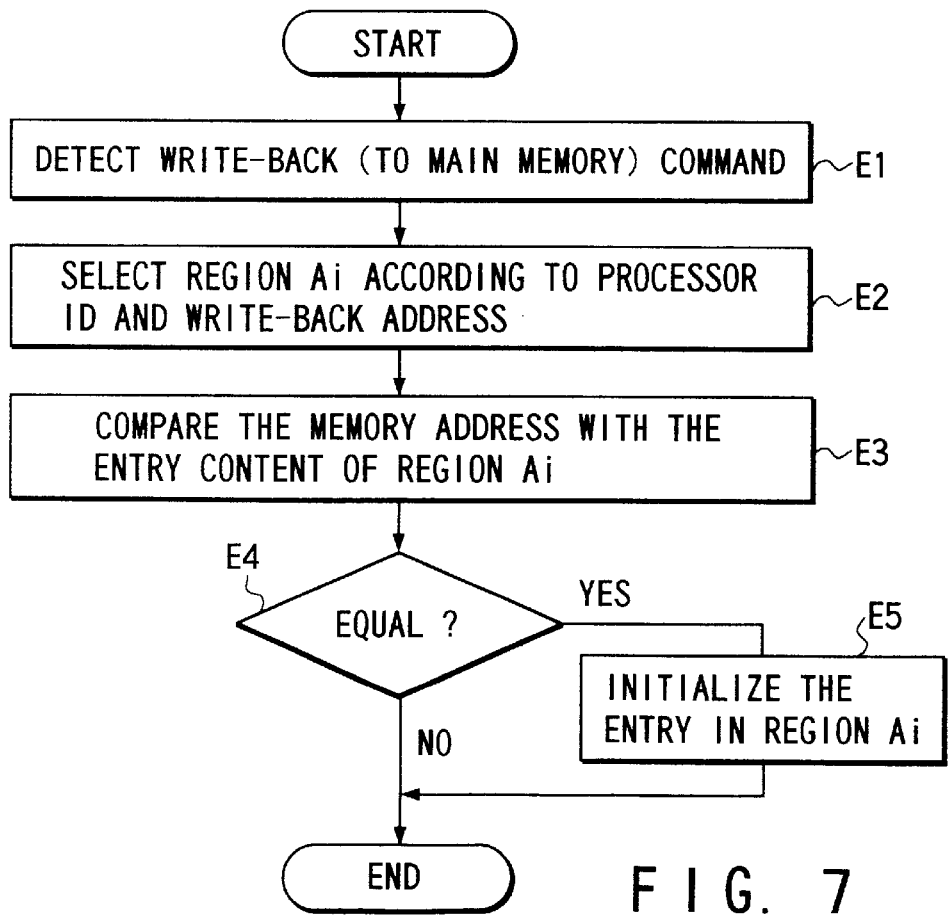
FIG. 7 is an operation diagram of the update address removing section of the second embodiment.

The operation of the update address removing section 34, as is depicted in FIG. 7, is slightly different at the point where it removes the update address from the entry only when the update address of the entry is equal to the memory address MW (E3, E4, E5).

Referring to FIG. 8, an example of the operation of the cache flush device and the cache memory is explained. In this example, there is only one processor 10 which sequentially writes data D0 at memory address 0, data D1 at memory address B×M, and data D2 at memory address 2B×M in this order. Here symbol B denotes the size of the cache block and M denotes the number of the cache blocks. The initial state of the $0^{th}$ cache block is assumed to be invalid and therefore the entry of the region $A_0$ does not have a valid update address.

(1) When the processor 10 is going to write D0 at memory address 0, the $0^{th}$ cache block does not hold the data of memory address 0. So a read-line-with-invalidate bus command for memory address 0 is issued on the system bus 40.

(2) When data of memory address 0 is supplied as a response of the above bus command, the update address registering section 33 stores memory address 0 as an update address in the entry of the region $A_0$. The processor 10 writes D0 into the $0^{th}$ cache block.

(3) When the processor 10 is going to write D1 at memory address B×M, the $0^{th}$ cache block holds data D0 in dirty state. A write-line bus command for data D0 is created and suspended in the write buffer. A read-line-with-invalidate bus command for memory address B×M is issued on the system bus 40.

(4) The update address registering section 33 overwrites memory address B×M as an update address in the entry of the region $A_0$. When the data of memory address B×M is supplied, the processor 10 writes data D1 into the $0^{th}$ cache block.

(5) Before issuing the write-line bus command for memory address 0, the processor 10 is going to write data D2 at memory address 2B×M. Another write-line bus command for data D2 is created and suspended in the write buffer. A read-line-with-invalidate bus command for memory address 2B×M is issued on the system bus 40. As a result, two write-line bus commands are suspended in the write buffer.

(6) The update address registering section 33 overwrites memory address 2B×M as an update address in the entry of the region $A_0$. When the data of memory address 2B×M is supplied, the processor 10 writes data D2 in the $0^{th}$ cache block.

(7) The write-line command for memory address 0 suspended within the write buffer is now issued to the system bus 40. Since the entry of the region $A_0$ has 2B×M which is different from memory address 0, the update address removing section 34 does not perform any operation.

(8) The write request command for memory address B×M suspended within the write buffer is now issued to the system bus 40. Since the entry of the region $A_0$ has 2B×M which is different from memory address B×M, the update address removing section 34 does not perform any operation.

(Configuration 2-B)

Each region should have one entry and a counter for keeping the number of update addresses corresponding to the region. The entry and the counter are used as follows.

(1) Counter value zero means that no update address stored in the region exists.

(2) When the update address registering section 33 detects update of data corresponding to a region, the update address registering section 33 writes the update address into the entry of the region and increments the counter by one.

(3) When the update address removing section 34 detects write-back of data from a dirty block, the update address removing section 34 decrements the counter of the corresponding region by one.

(4) When the counter of each region has a non-zero value, the flush executing section 35 issues a command for requesting write-back of data from the dirty block specified by the update address stored in the entry of the region.

Figure 9:
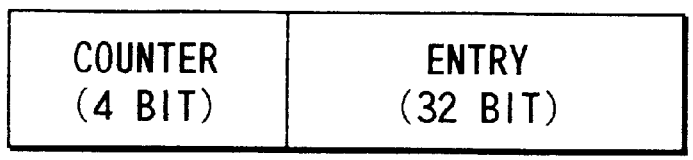
FIG. 9 is a conceptual view showing the structure of the region Ai according to a modification of the first embodiment.

A region Ai, as is depicted in FIG. 9, has a 4-bit counter as well as a 32-bit entry.

Figure 10:
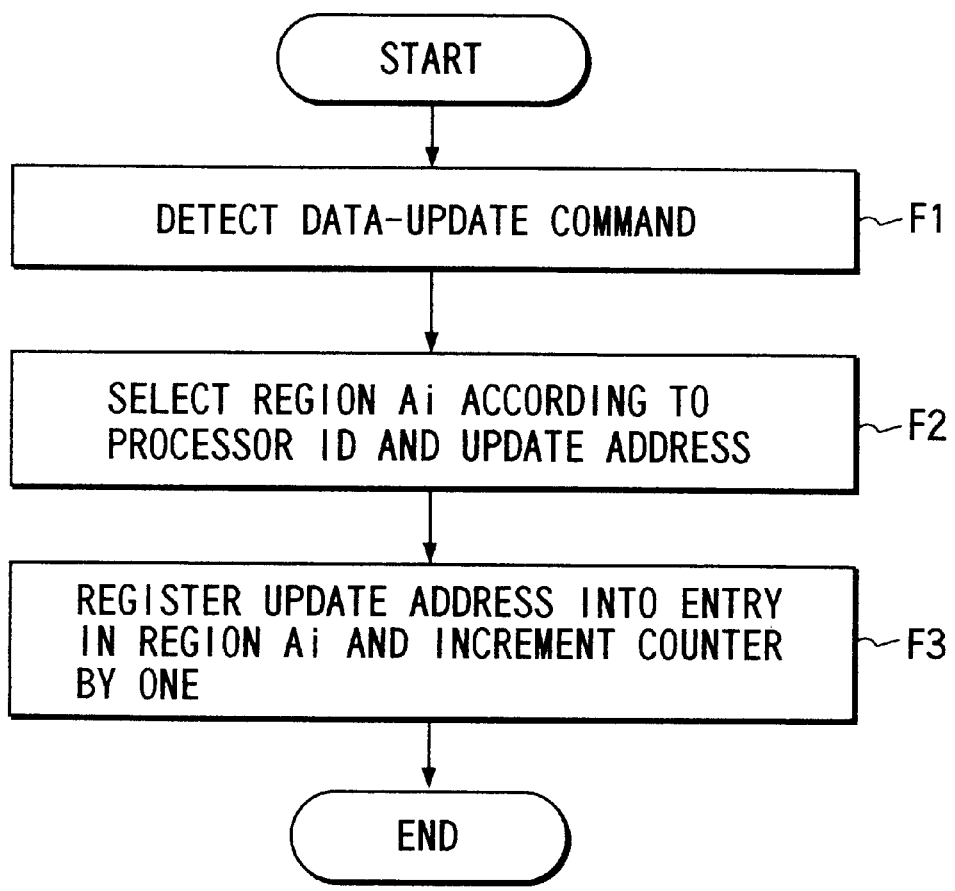
FIG. 10 is an operation diagram of the cache flush device which is performed when the update address registering section of the modification detects a data update command.
Figure 11:
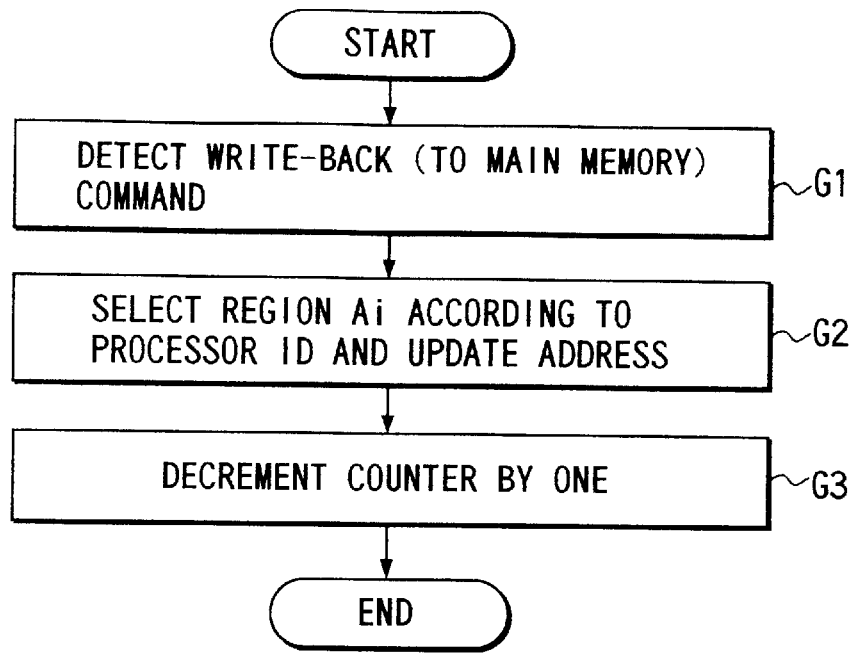
FIG. 11 is an operation diagram of the cache flush device which is performed when the update address removing section of the modification detects a command for writing-back the dirty block into the main memory.
Figure 12:
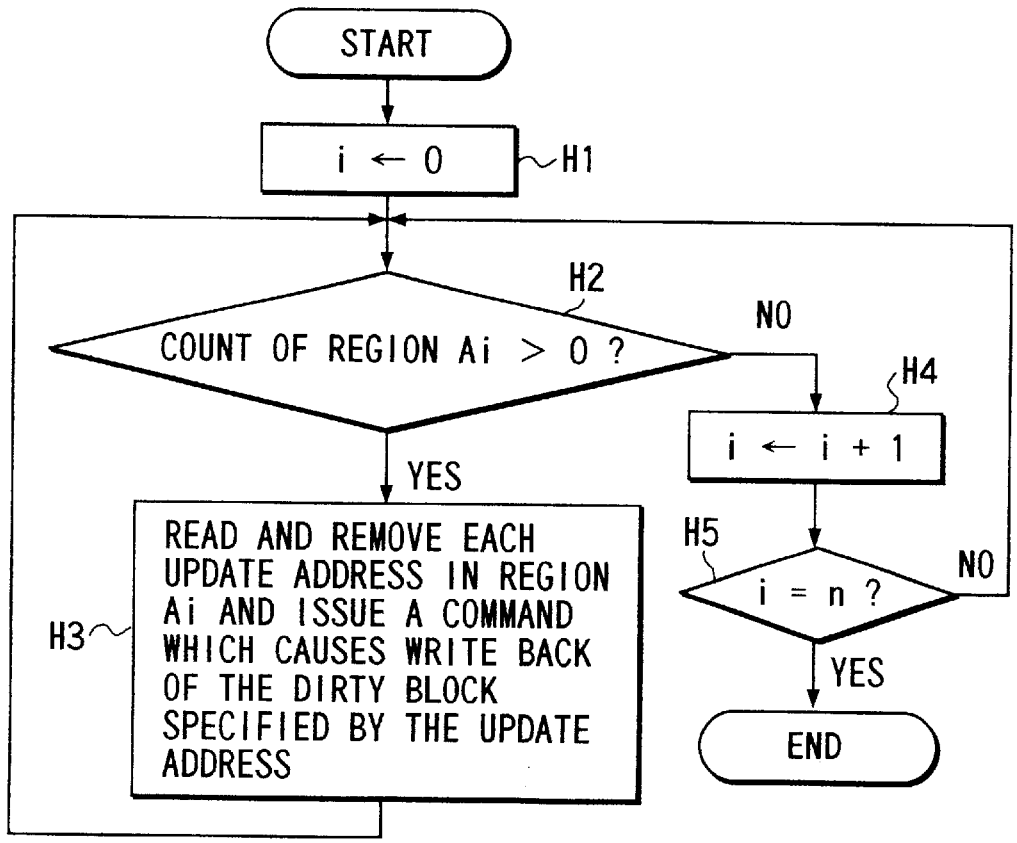
FIG. 12 is an operation diagram of the flush executing section of the modification.

The operation of the update address registering section 33 when a data update command is detected is shown in FIG. 10. FIG. 11 shows the operation of the update address removing section 34 when a data write-back command is detected. FIG. 12 shows the operation of the flush executing section 35.

Referring to FIG. 13, an example of the operation of the cache flush device and the cache memory is explained. In this example, there is only one processor 10 which sequentially writes data D0 at memory address 0, data D1 at memory address B×M, and data D2 at memory address 2B×M in this order. The initial state of the $0^{th}$ cache block is assumed to be invalid and therefore the entry of the region $A_0$ does not have a valid update address.

(1) When the processor 10 is going to write D0 at memory address 0, the $0^{th}$ cache block does not hold the data of memory address 0. So a read-line-with-invalidate bus command for memory address 0 is issued on the system bus 40.

(2) When data of memory address 0 is supplied as a response of the above bus command, the update address registering section 33 stores memory address 0 as an update address in the entry of the region $A_0$ and increments the counter to one. The processor 10 writes D0 into the $0^{th}$ cache block.

(3) When the processor 10 is going to write D1 at memory address B×M, the $0^{th}$ cache block holds data D0 in dirty state. A write-line bus command for data D0 is created and suspended in the write buffer. A read-line-with-invalidate bus command for memory address B×M is issued on the system bus 40.

(4) The update address registering section 33 overwrites memory address B×M as an update address in the entry of the region $A_0$ and increments the counter to two. When the data of memory address B×M is supplied, the processor 10 writes data D1 into the $0^{th}$ cache block.

(5) Before issuing the write-line bus command for memory address 0 , the processor 10 is going to write data D2 at memory address 2B×M. Another write-line bus command for data D2 is created and suspended in the write buffer. A read-line-with-invalidate bus command for memory address 2B×M is issued on the system bus 40. As a result, two write-line bus commands are suspended in the write buffer.

(6) The update address registering section 33 overwrites memory address 2B×M as an update address in the entry of the region $A_0$ and increments the counter to three. When the data of memory address 2B×M is supplied, the processor 10 writes data D2 in the $0^{th}$ cache block.

(7) The write-line command for memory address 0 suspended within the write buffer is now issued to the system bus 40. The update address removing section 34 decrements the counter of the region $A_0$ to two.

(8) The write-line command for memory address B×M suspended within the write buffer is now issued to the system bus 40. The update address removing section 34 decrements the counter of the region $A_0$ to one.

(3. Preferable configuration for a direct-map cache memory without a write buffer and more than one processor)

The number of the processors is denoted by P. The cache block size is denoted by B (bytes) and the number of the cache blocks is denoted by M.

In this case, either of two examples below may be employed.

(Configuration 3-A)

The number of the regions is made to be P×M, and each region has one entry. There is a one-to-one correspondence between a cache block of a processor and a region.

The update address registering section 33 and the update address removing section 34 are required to select the region according to the processor identifier and the memory address. Since each part of the cache flush device is almost the same as that of the preferable configuration, the detailed explanation is omitted.

(Configuration 3-B)

The number of the regions is made to be M and each region has P entries. A region Ai is made to correspond to the i-th cache block of each processor 10.

When a data update or a data write-back command is detected, a region is selected according to the memory address but not according to the processor identifier. Therefore, the processor identifier is not required to select a region while it is required in configuration 3-A. Thus, this configuration is effective in a case where it is difficult to know the processor identifier because of the system bus specification.

However, there arises a problem in that the configuration 3-B cannot be adapted to processors with a write buffer. For such a case, the configuration 3-A or second to fourth embodiments to be described later should be employed.

(4. Preferable configuration for a N-way set-associative cache memory without a write buffer)

In this case N cache blocks form a group, and data at address a is stored in a cache block in the ((a/B) mod (M/N))th group. Here, B denotes the cache block size (in bytes) and M denotes the number of the cache blocks.

(Configuration 4-A)

The number of the regions is made to be M/N, and each region is made to consist of N entries. Data at address a is stored in the ((a/B) mod (M/N))th region. However, this method has a problem in that it can not be applied to a processor with a write buffer. For a processor having both a set-associative cache memory and a write buffer, the second to fourth embodiments should be employed.

(Configuration 4-A)

In a case where the set-associative cache memory 20, when one of its cache blocks stores a data, asserts some control signal lines to indicate which way of the cache blocks stores the data, the set-associative cache memory can be treated as a direct-map cache block. In this case, configurations 2-A and 2-B are effective for a processor with a write buffer.

When the processor 10 requires the cache flush device 30 to perform the cache flush procedure, the flush executing section 35 issues bus commands each of which causes a write-back of data from a dirty block.

Now, the bus command which can be used to write back data from a dirty block is explained.

In many systems, a Read-Line command can be used. A Read-Line command, in such systems, requests the newest data of the specified address. When a cache memory holds the data in the dirty state, the cache memory makes a reply with the data. Then the main memory controller 50 observes the reply and stores the data into the specified portion of the main memory. In some both er systems, when a Read-Line command is issued and a cache memory hold the data in the dirty state, the cache memory replies a Retry command (requiring to issue a Read-Line command again later). Then, the cache memory issues a Write-Line command to the system bus to write-back the data from the dirty block into the main memory. When a Read-Line command is issued later, not the cache memory but the main memory replies.

However, there are another type of computer systems where a dirty block remains in the dirty state even when a Read-Line command has been issued for the dirty block. There are two effective ways for such a system.

(Configuration 5-A)

One way is that both Read-Line-with-lnvalidate command and Write-Line command are used. The cache flush device 30, when performing the cache flush, issues a Read-Line-with-Invalidate command for a dirty block then issues a command for making invalid the contents in the dirty block, and then Write-Line command is issued so that data, which is read previously, is written-back into the main memory 51. The foregoing method requires the cache flush device 30 a full functionality of a cache memory 20 for storing the dirty block in order to maintain the data coherency.

(Configuration 5-B)

Figure 14:
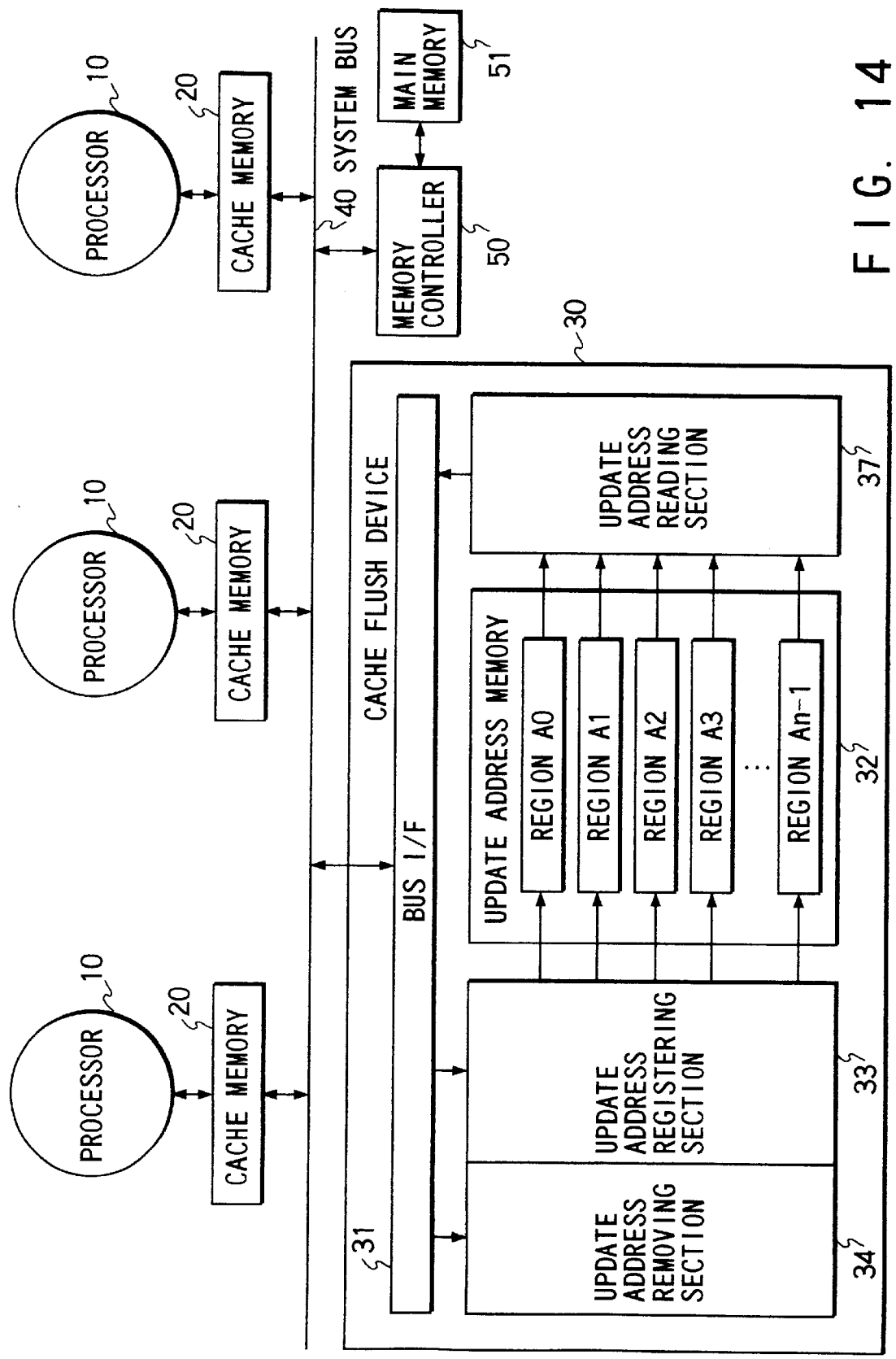
FIG. 14 is a diagram showing the structure of a computer system according to another modification of the first embodiment.

Referring to FIG. 14, the other way is that the processor 10 reads the update addresses stored in the update address memory 32 and executes suitable instructions for writing-back of data according to the read addresses. For this purpose, an update address reading section 37 provides to the processor 10 a function for sequentially transferring all of the update addresses stored in the update address memory 32. The update address reading section 37 provides a new update address each time the update address is read by the processor 10. If plurality of update addresses can be read in parallel by the processor, it leads to speed up the procedure.

The processor 10 uses the address read to write-back the contents of the associated dirty block into the main memory. At this time, the processor 10 uses a cache instruction or reads, from the main memory, data at some other address which falls on the associated dirty block so that replacement of data occurs. By repeating this operation until no update address remains, the data of all dirty blocks are written-back into the main memory.

Configuration 5-B has an advantage that the hardware is simple since the cache flush device 30 does not have to manage the data coherency. Further, in comparison to the conventional method in which the processor 10 executes all of the processes by a software, the dirty block can efficiently be detected and thus the cache flush process can be performed more quickly.

Figure 15:
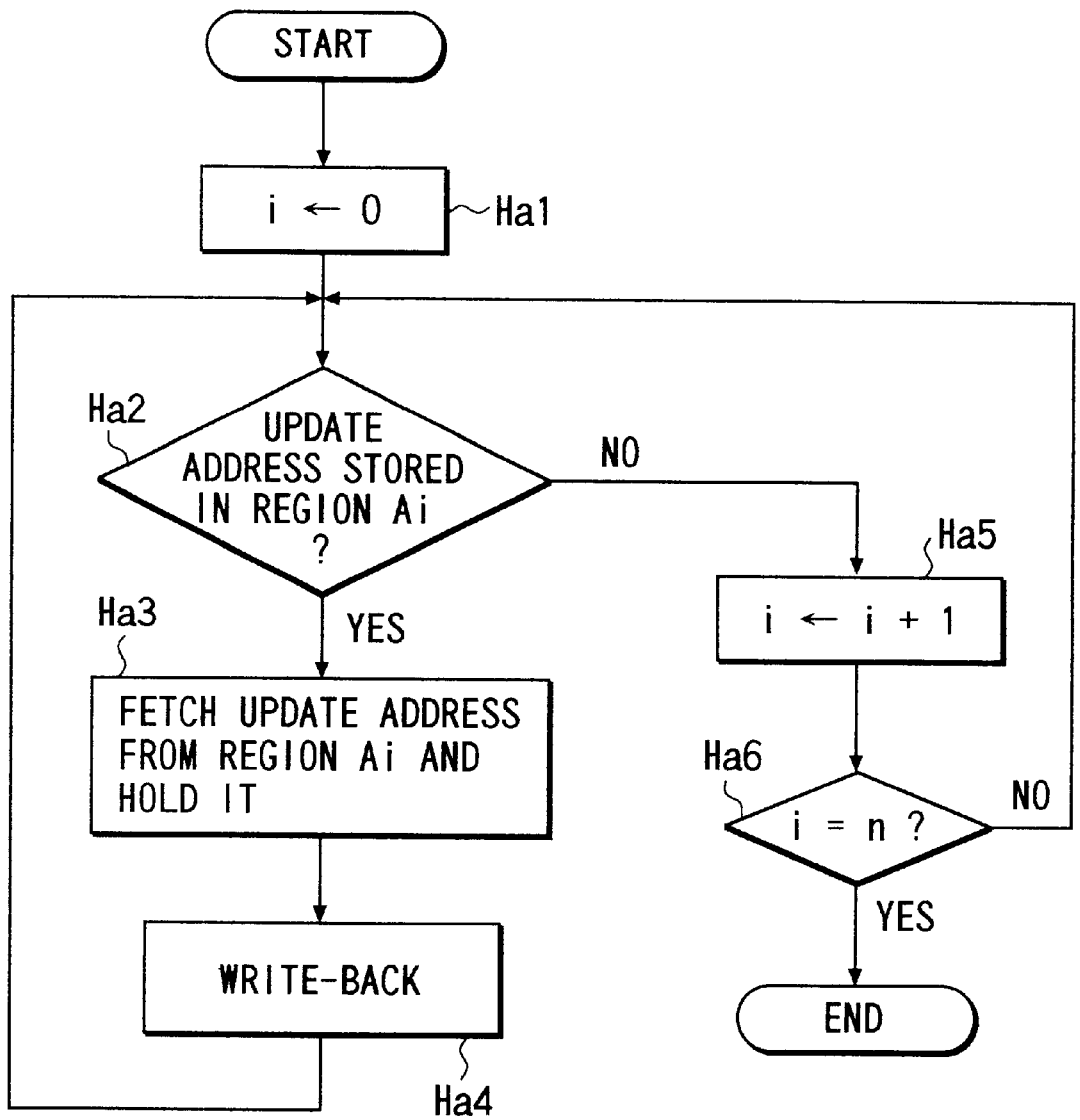
FIG. 15 is an operation diagram of the other modification shown in FIG. 14.

The cache flush operation under configuration 5-B is shown in FIG. 15. At step Ha1, a parameter i for indicating the region is initialized as 0. At step Ha2, it is examined whether an update address is stored in the region Ai. If YES at step Ha2, an update address stored in the region Ai is fetched at step Ha3 and the data of the associated update address is written back at step Ha4 and then the flow returns to the step Ha2.

If NO at step Ha2, the parameter i is incremented by one at step Ha5 and it is examined at step Ha6 whether the parameter i becomes equal to n, the number of the regions. If NO at step Ha6, the flow returns to the step Ha2. If YES at step Ha6, the operation is completed.

Other embodiments of the present invention will now be described. In the description below, portions corresponding to those of the first embodiment are given the same reference numerals and description of the corresponding portions is omitted.

Comparing the required time of a cache flush procedure performed by the cache flush device 30 according to this embodiment and that of a conventional cache flush procedure, they do not differ significantly in a case where the dirty block ratio (the ratio of the number of dirty blocks and the number of the whole cache blocks) is high. It is because writing-back data from dirty blocks occupies a dominant portion of the processing time.

On the other hand, when the dirty block ratio is low (for example 10%), the former becomes much shorter while the latter is not reduced, because the search of dirty blocks occupies a dominant part.

The embodiment has another advantage that at the end of the cache flush procedure, the cache blocks which were dirty at the beginning of the cache flush procedure remain to have the valid data.

The embodiment has yet another advantage that the cache flush procedure and the normal data processing by the processors 10 can be done in parallel, which will be described in fifth and sixth embodiments.

(Second Embodiment)

Figure 16:
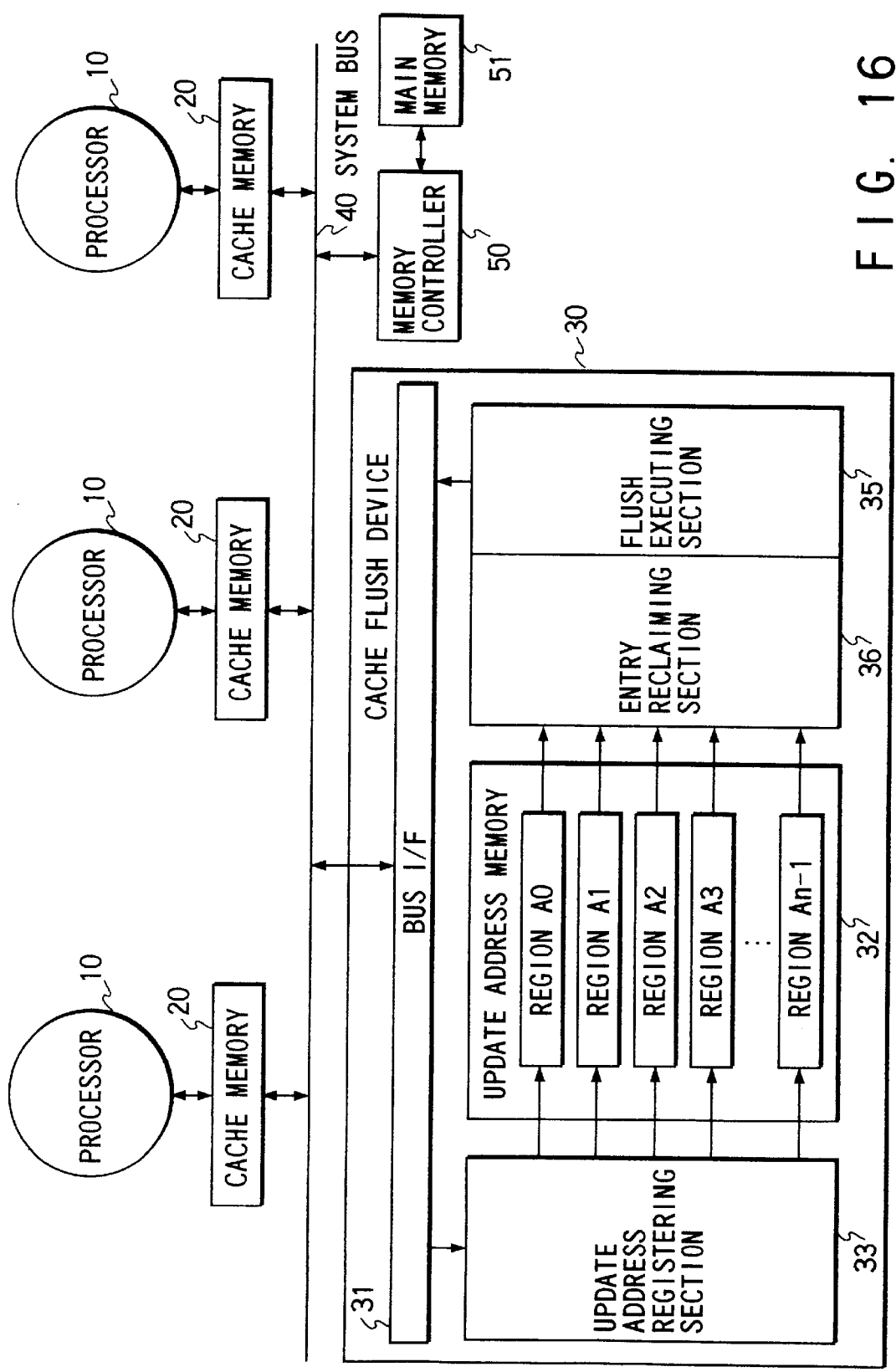
FIG. 16 is a diagram showing the structure of a computer system according to a second embodiment.

A second embodiment of the present invention will now be described. FIG. 16 shows the structure of a computer system according to the second embodiment of the present invention. The structure of the computer, to which the cache flush device 30 is applied, is the same as that according to the first embodiment.

The cache flush device 30 comprises the system bus interface 31, update address memory 32 (regions $A_0$ to $A_{n-1}$), update address registering section 33, flush executing section 35 and an entry reclaiming section 36.

The update address memory 32 is composed of n regions (regions $A_0$ to $A_{n-1}$) for storing addresses of all of the dirty blocks. In this embodiment, the addresses of all the dirty blocks are stored in the update address memory 32. However, the update address memory 32 may also hold addresses of the associated cache block which is not dirty. The reason for this is that the update address removing section 34 of the first embodiment is omitted from the configuration of this embodiment. This is the main difference from the first embodiment.

The structure of the region Ai will now be described. In order to indicate whether the value stored in each entry of the region Ai is valid, the method described in the first embodiment may be employed. However, it is more preferable to employ the following method.

That is, a plurality of entries forming a region is used as a cyclic buffer. A reading pointer (R pointer) and a writing pointer (W pointer) are provided. Then, the update addresses are arranged to be stored in the entries between the R pointer and the W pointer except the entry designated by the W pointer. When the W pointer and the R pointer coincide with each other, it is ambiguous whether all of the entries are empty or all of the entries are filled with update addresses. In order to identify the above cases, a region Ai is equipped with a fullness flag, a one bit flag. This method is advantageous to improve the performance of the update address registering section 33 and that of the flush executing section 35.

FIG. 17 is a conceptual view showing the structure of a region according to this embodiment. The R pointer designates the update address which was registered least recently. The W pointer designates the position, at which a new update address must be registered. The fullness flag is ON only when every entry holds a valid update address.

The update address registering section 33 is the same as that of the first embodiment.

When the update address registering section 33 is going to write an update address to a certain region and detects there is no empty entry belonging to the region, the entry reclaiming section 36 selects an arbitrary entry in the address registering section 33 and issues a bus command for writing-back the contents of the dirty block of the selected entry. Then, the selected entry is used to store the new update address. Note that it is most effective that the entry reclaiming section 36 reclaims an entry in the above-mentioned way. However, the reclaiming operation may be performed somewhat earlier when one or a few empty entries exist.

Figure 18:
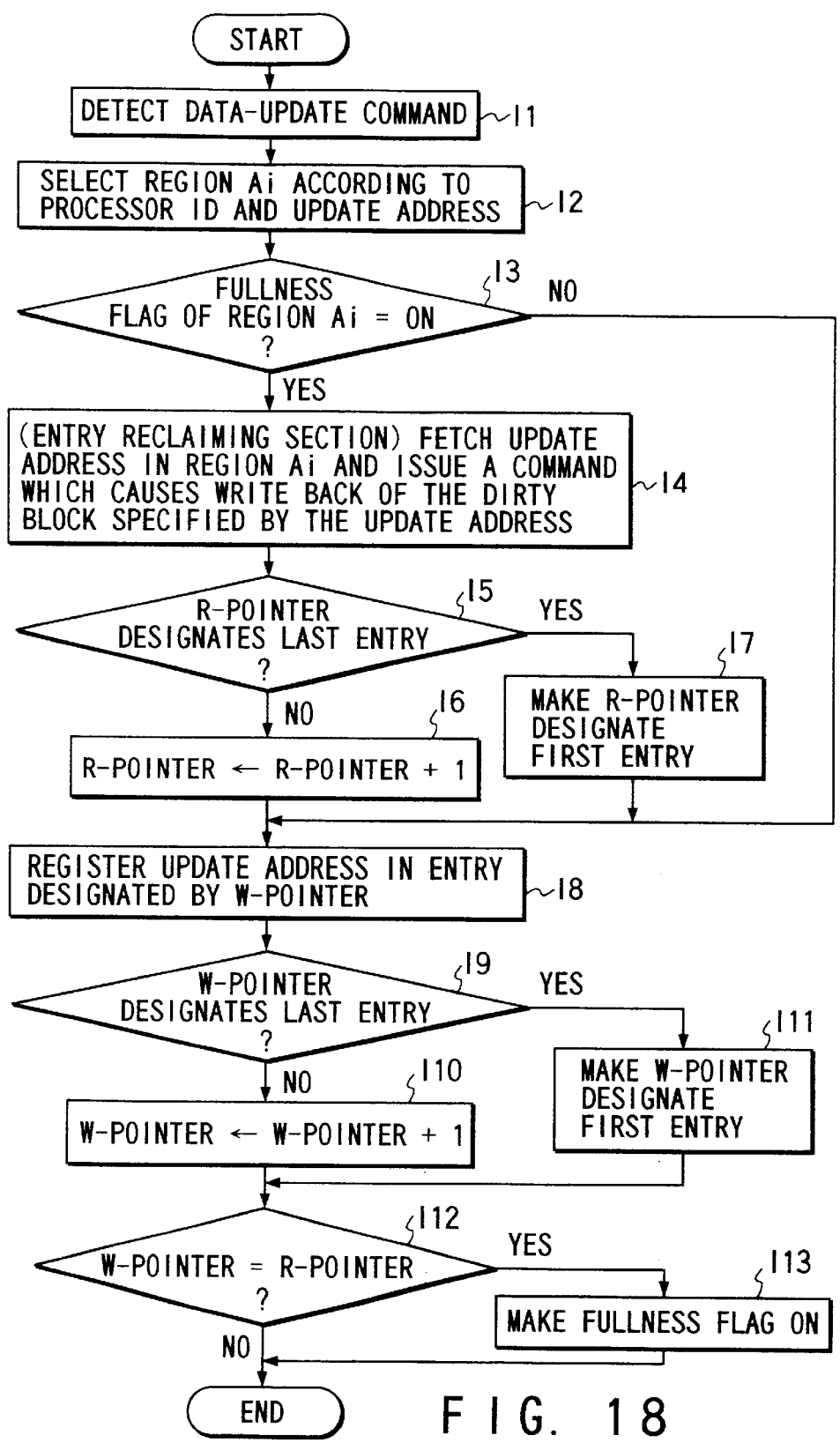
FIG. 18 is an operation diagrams of the update address registering section and an entry reclaiming section when the update address registering section detects a command indicating data update in the cache memory of the second embodiment.

FIG. 18 is an operation diagram of the update address registering section 33 and the entry reclaiming section 36 when a command indicating data update in the cache memory 20 is detected by the update address registering section 33. When the command indicating data update is detected at step I1, corresponding region Ai is identified according to the processor identifier and the update address at step I2. At step I3 the fullness flag of the region Ai is examined. If OFF at step I3, the operation jumps to step I8. If ON at step I3, the entry reclaiming section 36 uses the address in the entry designated by the R pointer of the region Ai to issue a bus command to write-back the data in the dirty block into the main memory at step I4. At step I5 whether or not the R pointer designates the last entry is examined. If No at step I5, the R pointer is incremented by one at step I6. If Yes at step I5, the R pointer is set to designate the first entry at step I7. At step I8 the update address is registered to the entry designated by the W pointer.

At step I9 whether or not the W pointer designates the last entry is determined. If No at step I9, the W pointer is incremented by one at step I10. If Yes at step I10, the W pointer is set to designate the first entry at step I11. At step I12 the equality of the W pointer and the R pointer is examined. If YES, the fullness flag is turned ON at step I13, and then the operation ends. If NO, the operation ends without changing the fullness flag.

The operation of the flush executing section 35 is shown in FIG. 19. The flush executing section 35, receiving a cache flush request issued from the processor 10 fetches all of the addresses stored in the update address memory 32 (so that the read addresses are removed from the update address memory 32) and issues bus commands each of which writes back the data of a dirty block.

In this embodiment, the effective update addresses are stored in only entries of the range designed by the R pointer and the W pointer of each region Ai. Therefore, the update addresses can be efficiently fetched.

The operation of the cache flush device 30 according to this embodiment will now be described.

(Initialization)

The processor 10 initializes the cache flush device and the state of the cache memory 20 in order to match the state of the cache memory 20 and the state of the update address memory 32 of the cache flush device 30 prior to activating the cache flush device 30. The initialization is performed such that all of the cache blocks are invalidated. Although it is not inevitable, it is still recommended in terms of performance that the R pointer and W pointer of each region are set to designate the same entry.

(Normal Operation of Cache Flush Device 30)

After the processor 10 performs the initialization, each section of the cache flush device 30 perform predetermined operations so that addresses of all the dirty blocks are stored in the update address memory 32. However, when the data of a certain dirty block is written-back into the main memory 51, any of the addresses stored in the regions $A_0$ to $A_{n-1}$ is not removed. Therefore, a case is probable to take place where a dirty block turns to a non-dirty block while the associate address remains in the update address memory 32.

When the update address registering section 33 detects that data is updated on the cache memory 20, the update address registering section 33 selects one of the regions $A_0$ to $A_{n-1}$ according to the update address and the processor identifier 10. If no empty entry exists in the region, that is, the fullness flag is ON, the entry reclaiming section 36 issues, to the system bus 40, a bus command to write-back the data of the dirty block having the address stored in the entry designated by the R pointer. If the dirty block having the address exists, the data is actually written-back into the main memory 51. If no dirty block having the address exists, no operation is performed. Since the foregoing operation assures that no dirty block corresponding to the address exists, the entry designated by the R pointer can be used to hold the update address.

When the data of the dirty block is written-back into the main memory 51 during the normal data processing of the processor 10, the cache flush device 30 do not perform any operation.

(Cache Flush Operation by Cache Flush Device 30)

When the processor 10 requests the cache flush device 30 to start cache flush, the flush executing section 35 fetches all of the addresses stored in the update address memory 32 and issues bus commands each of which writes-back the data of the dirty block.

As a result, the state of the cache memory and the state of the cache flush device 30 return to the initial state.

In comparison to the first embodiment, this embodiment is able to associate the addresses and the regions more flexibly. That is, in the first embodiment, the regions of the update address memory 32 should resemble the structure of the cache memory 20. However in the second embodiment, this restriction is not necessary and a cache flush device of the second embodiment may be applicable over various cache memory architecture so far as the bus specification does not vary.

Examples of associating the addresses and the regions will now be described.

(Configuration 6)

It is assumed that the cache memory 20 is a direct map and the number of the processors is p. In this case, a region can be provided to the i-th cache block of all the processors 10. Assuming that the number of the cache blocks in one cache memory 20 is M, the number n of the regions is M.

Although the first embodiment requires p or more entries for forming one region, the number of entries can be reduced in this embodiment. In this case, p cache blocks correspond to one region, the number of entries may be about p/2 because the probability at which a certain cache block is dirty is usually from 20% to 50%. Moreover, any special mechanism to cope with a write buffer of the processor 10 is not required because of the reason described later.

(Configuration 7)

In an extreme case, the number of regions may be one. Since the number of the cache blocks is p×M, the number of entries is made to be from p×M/4 to p×M/2. The configuration of the cache memory 20 may be direct map, set associative method, full associative or of any both er scheme.

In this embodiment, the cache flush device 30 does not issue any bus command when an empty entry exists. If no empty entry exists, a bus command is issued to cause a writing-back of data of a dirty block.

When the number of the region is made to be one, the advantage is that the hardware for selecting the region according to the processor identifier and the update address can be omitted. However, it leads to a poor performance because it tends to cause unnecessary write back of data of a dirty block.

(Configuration 8)

A case where the cache memory 20 is N-way set associative, the number of cache blocks is M and the number of processors is p will now be described. It is assumed that the size of a cache block is B bytes. In this case, N cache blocks form a group, and data at address a is stored in ((a/B) mod (M/N))th cache block group.

It is further assumed that the number of regions is p×M and the number of entries of each region is 1. Moreover, update of data at address a performed by a processor having processor identifier k is made to correspond to a (M×k+(a/B mod M))th region.

With the foregoing method, while the cache memory 20 acts as N-way set associative, the cache flush device 30 manages the update addresses like a direct map cache memory. When the processor 10 having an identifier 0 is going to update data at address B×M where the cache block has the data of address 0 in a dirty state, the cache flush device 30 issues a bus command to cause a write-back of data of address 0 into the main memory 51.

In this embodiment, one region can be made to correspond to a certain cache block of all of the processors 10 as described in Configuration 7 and 8. As a result, the update address registering section 33 does not necessarily require the identifier of the processor 10.

Referring to FIG. 20, the operations performed when the processor 10 successively writes data D0, D1 and D2 to addresses 0, B×M and 2B×M will now be described. Note that symbol B indicates the size of the cache block, and M indicates the number of cache blocks of the processor. The number of entries of the region $A_0$ is made to be 2.

(1) Although the processor 10 is going to write data D0 at address 0, the data at address 0 does not exist in the cache block 0. Therefore, the processor 10 issues a bus command for requesting the data from address 0 to address (B−1) and notifying update of the data to the both er processors 10.

(2) As a result, the data is brought and stored into the cache block 0 in a dirty state. Among the data, data at address 0 is updated to D0. The address 0 is stored in the region A0 as an update address.

(3) Although the processor 10 is going to write data D1 at address B×M, data at the address B×M is not stored in the cache block 0. Therefore, a bus command for writing-back data at address 0 into the main memory 51 is stored in the write buffer. Then, a bus command is issued for requesting data from address B×M to address (B×M+B−1) and notifying update of the data to the both er processors 10.

(4) As a result, data from address B×M to address (B×M+B−1) is brought and stored in the cache block 0 in dirty state. Among stored data, data at address B×M is updated to Dl. Address B×M is newly stored in the region A0 as update addresses.

(5) Although the processor 10 is going to write data D2 at address 2B×M, data at the address 2B×M is not stored in the cache block 0. Therefore, a bus command for writing-back data at address 0 into the main memory 51 is stored in the write buffer. Then, a bus command is issued for requesting data from address 2B×M to address (2B×M+B−1) and notifying update of the data to the both er processors 10.

(6) As a result, data from address 2B×M to address (2B×M+B−1) is brought and stored in the cache block 0 in dirty state. Among stored data, data at address 2B×M is updated to Dl. Address 2B×M is newly going to be stored in the region A0 as update addresses. As the fullness flag is ON, a write-back command of address 0 is scheduled to be issued.

(7) The write-back command which has been held in the write buffer since (3) and the write-back command scheduled in (6) are issued.

(8) The write-back command of data D1 at address 2B×M which has been held in the write buffer is issued.

(9) The sequence of the operations comes to an end where both 2B×M and B×M exists as update addresses in the entries of the region A0. Note that only 2B×M is the valid update address.

(Third Embodiment)

A third embodiment of the present invention will now be described.

Figure 21:
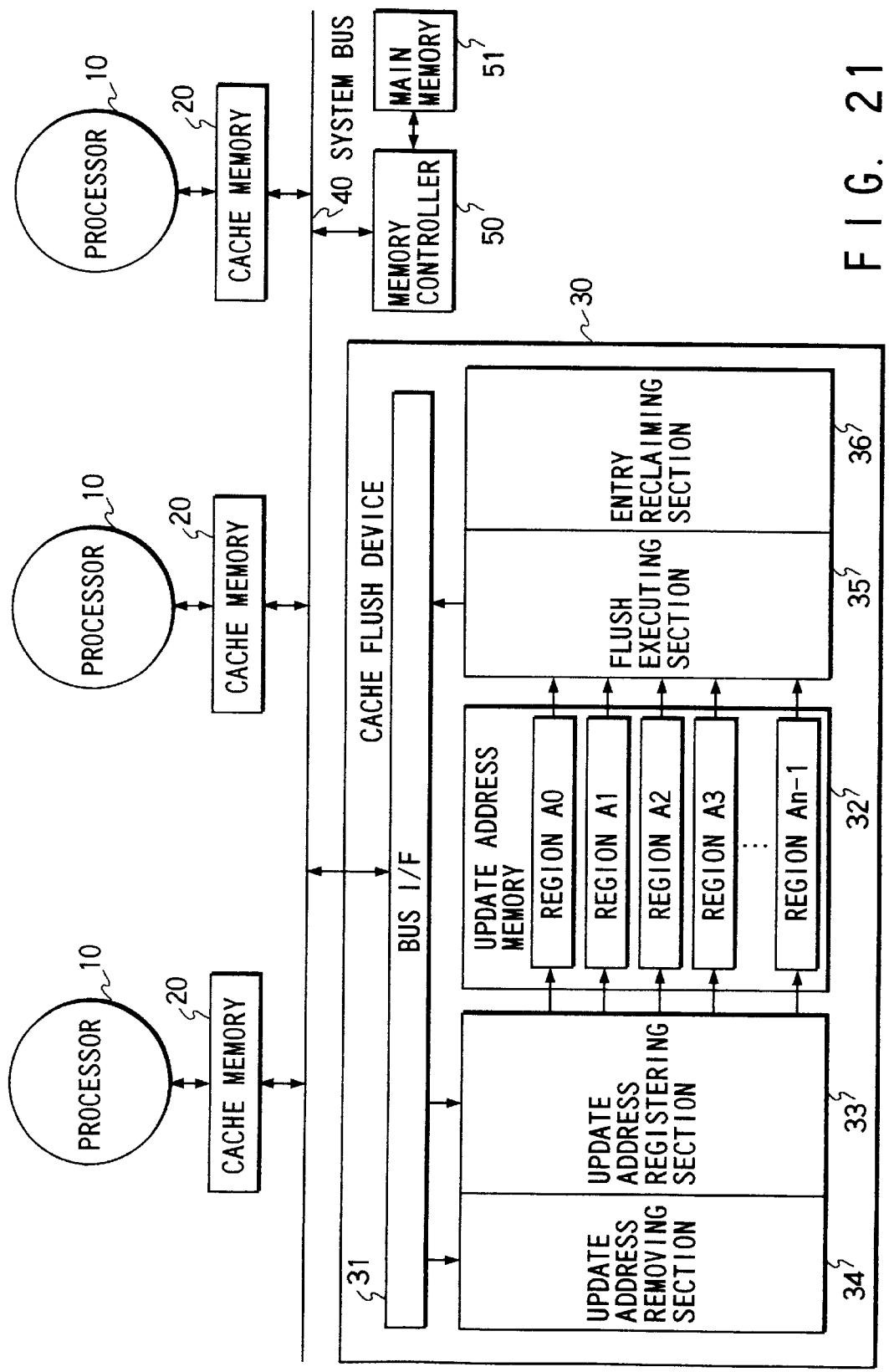
FIG. 21 is a diagram showing the structure of a computer system according to a third embodiment.

FIG. 21 shows the structure of the computer system according to the third embodiment. The cache flush device 30 is applied to the same computer as of the first and second embodiments.

The cache flush device 30 comprises a system bus interface 31, update address memory 32 (regions $A_0$ to $A_{n-1}$), update address registering section 33, update address removing section 34, flush executing section 35 and entry reclaiming section 36.

The update address memory 32, the update address registering section 33, the flush executing section 35 and the entry reclaiming section 36 are the same as those according to the second embodiment.

The difference from the second embodiment is that the update address removing section is added like the first embodiment. While the update address removing section of the first embodiment, when a write-back bus command is observed, always seeks and clears the entry having the address contained in the bus command, the update address removing section of the third embodiment, when a write-back bus command is observed, tries to seek the entry for a certain time. If it is successful, the entry is cleared. Otherwise the entry remains unchanged. Since there is a possibility that the update address memory 32 holds addresses whose associated dirty blocks do not exist any more, the entry reclaiming section 36 is necessary as in the second embodiment.

A typical example in which the update address removing section 34 tries to seek the entry which holds the same address as that of the write-back bus command for a predetermined time will now be described with reference to an operation diagram shown in FIG. 22.

Figure 22:
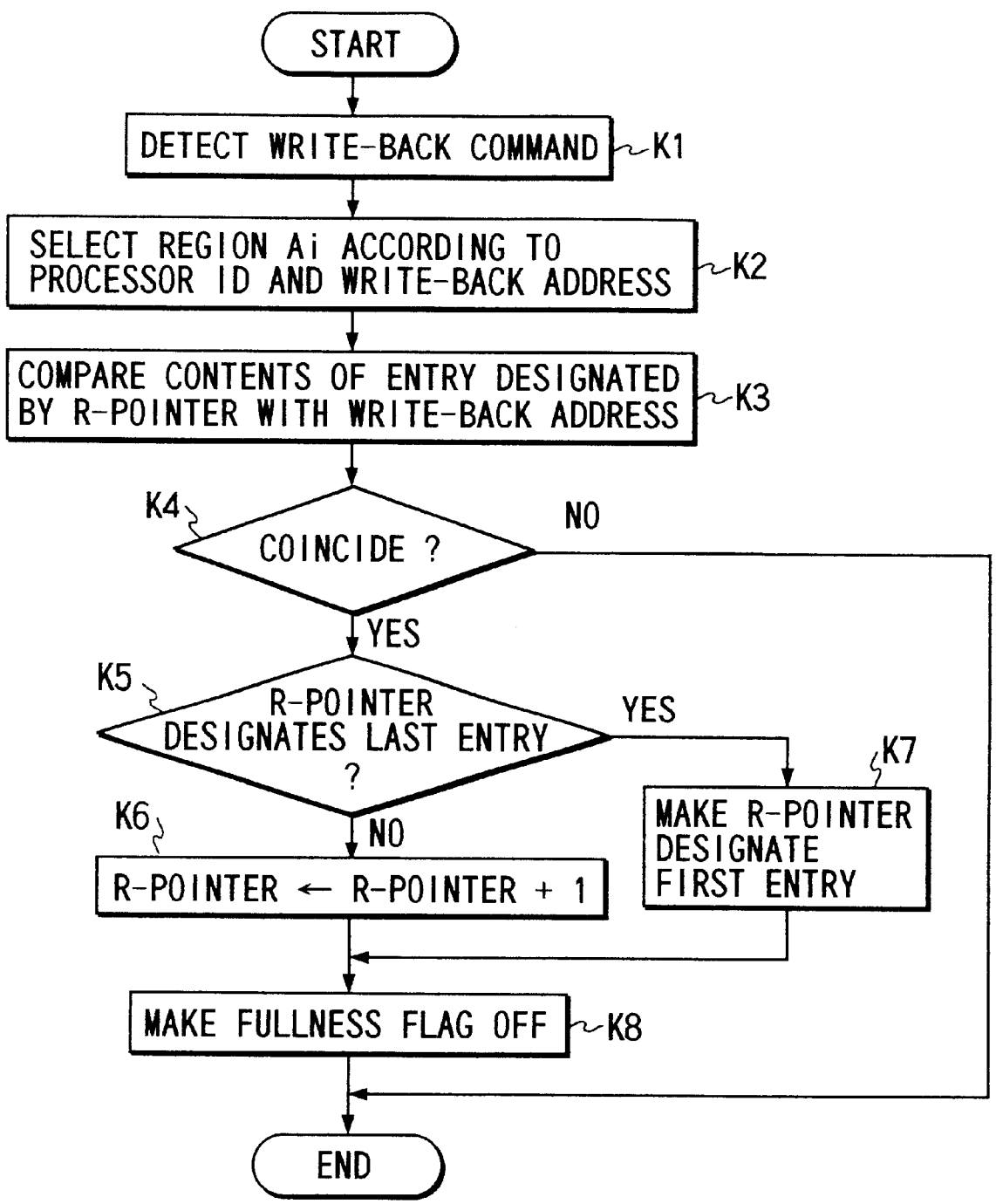
FIG. 22 is an operation diagram of the update address removing section of the third embodiment for seeking the entry in which the same address as the write-back address is stored, for a predetermined time.

As shown in FIG. 22, the update address removing section 34 compares the contents of the entry designated by the R pointer with the write-back address (step K3). If they are the same, the update address removing section 34 advances the R pointer (steps K5 to K6) so as to remove the update address. As a result, the performance can be improved.

Instead of seeking the entry for a predetermined time, seeking the entry until a next bus command indicating data update or a bus command for writing-back the contents of the dirty block is detected. This modification improves the performance furthermore because the possibility for the update address removing section 34 to remove the update address from the update address memory 32 is raised.

Moreover, when a bus command which shows a cache block is non-dirty is detected, the update address removing section can try to seek and remove the entry. It improves the performance.

(Fourth Embodiment)

Figure 23:
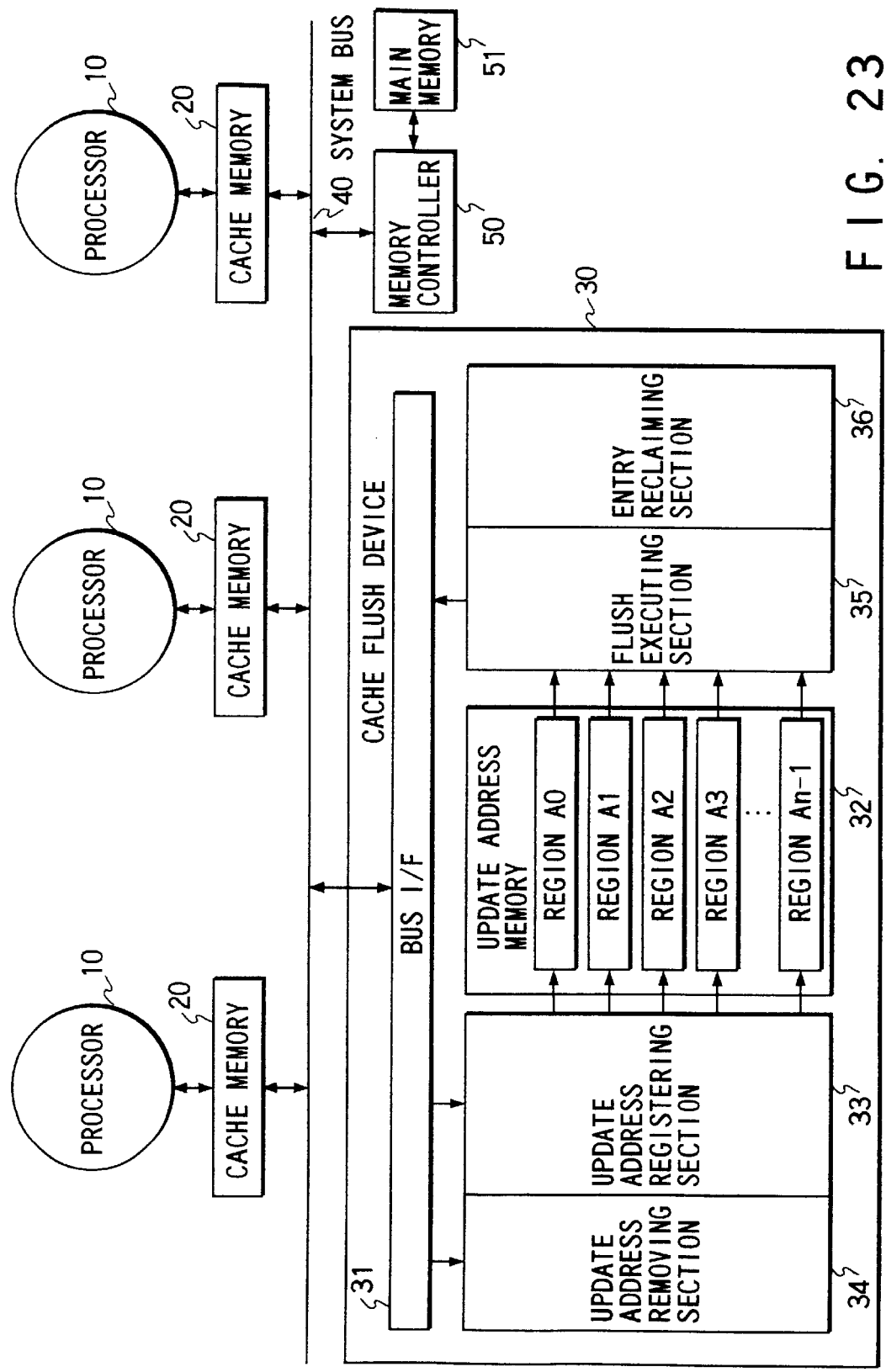
FIG. 23 is a diagram showing the structure of a computer system according to a fourth embodiment.

A fourth embodiment of the present invention will now be described. FIG. 23 shows the structure of a computer system according to the fourth embodiment of the present invention. The structure of the computer to which the cache flush device 30 is applied is the same as those according to the first and second embodiments.

The cache flush device 30 comprises the system bus interface 31, update address memory 32 (regions $A_0$ to $A_{n-1}$), update address registering section 33, update address removing section 34, flush executing section 35 and entry reclaiming section 36.

Figure 24:
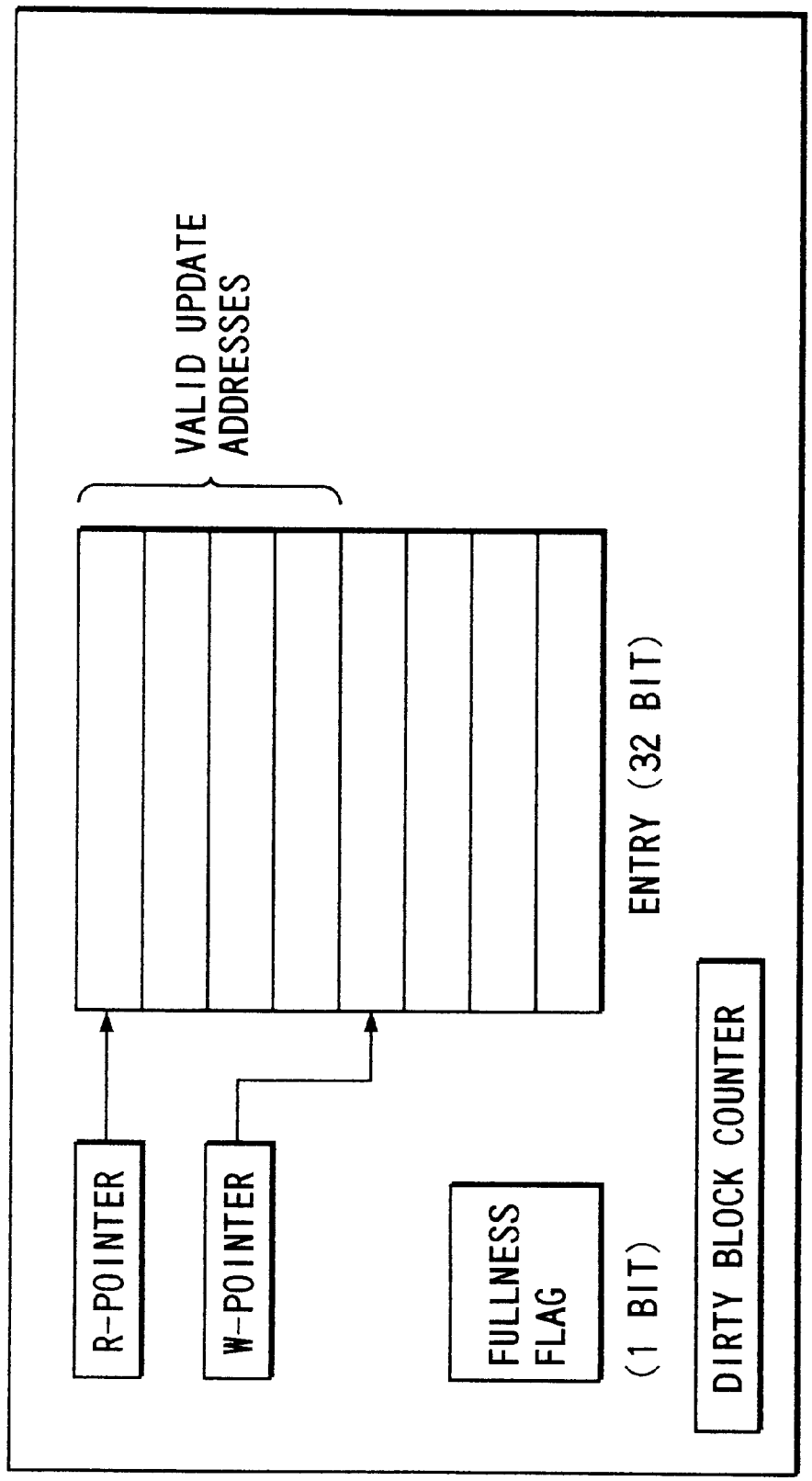
FIG. 24 is a conceptual view showing the structure of the region of the update address memory of the fourth embodiment.

The update address memory 32 has, in addition to the element of that according to the second embodiment, a dirty block counter for maintaining the number of dirty blocks corresponding to the regions, as shown in FIG. 24.

In addition to the elements according to the second embodiment, the update address registering section 33 has a function for, by one, increasing the count value of the dirty block counter corresponding to the regions.

The entry reclaiming section 36 is the same as that of the second embodiment.

Figure 25:
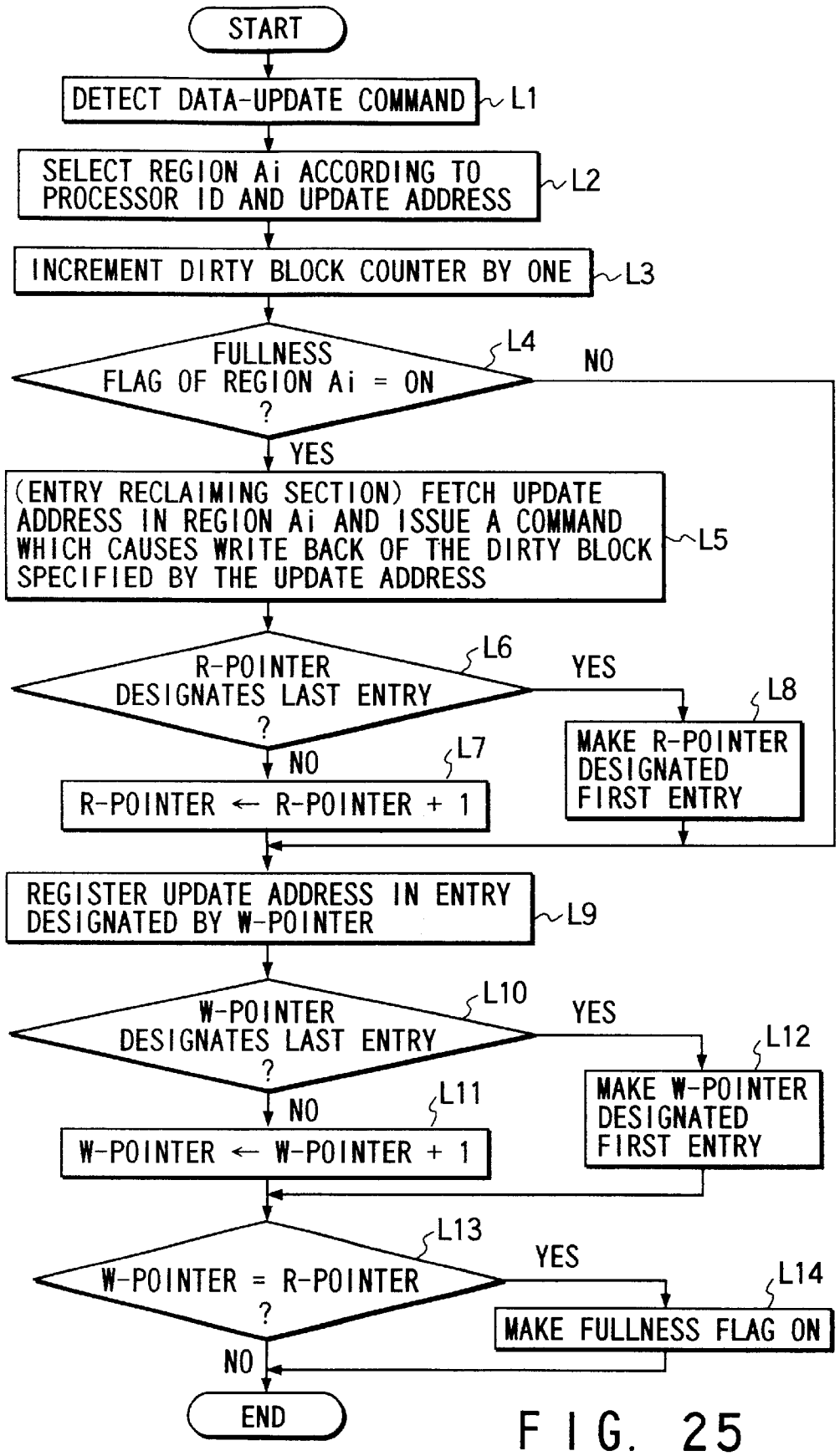
FIG. 25 is an operation diagrams of the update address registering section and the entry reclaiming section of the fourth embodiment when the update address registering section detects a command indicating data update in the cache memory.

FIG. 25 is an operation diagram of the update address registering section 33 and the entry reclaiming section 36 when the update address registering section 33 detects a command indicating data update in the cache memory 20. When the command indicating data update is detected at step L1, the corresponding region Ai is identified according to the processor identifier and the update address at step L2. At step L3, the dirty block counter is incremented by one. At step L4, it is determined whether or not the fullness flag of the region Ai is ON. If NO at step L4, the process is shifted to step L9. If YES at step L4, the entry reclaiming section 36 uses the address in the entry designated by the R pointer of the region Ai to issue a command for requesting writing-back of the data in the dirty block into the main memory at step L5. At step L6, it is determined whether or not the R pointer designates the last entry. If NO at step L6, the R pointer is incremented by one at step L7. If YES at step L6, the R pointer is caused to designate the first entry at step L8. Then, step L9 is performed. At step L9, the update address is registered to the position designated by the W pointer.

At step L10, it is determined whether or not the W pointer designates the last entry. If NO at step L10, the W pointer is incremented by one at step L11. If YES at step L10, the W pointer is caused to designate the first entry at step L12. Then, step L13 is performed. At step L13, it is determined whether or not the positions respectively designated by the W pointer and the R pointer are the same. If the same positions are pointed, the fullness flag is turned on at step L14, and then the operation is ended. If the designated positions are not the same, the operation is immediately ended.

FIG. 26 shows an operation of the update address removing section 34. When the update address removing section 34 detects a command for writing-back the contents of the dirty block into the main memory 51 (step M1), the update address removing section 34 selects one of n regions ($A_0$ to $A_{n-1}$) forming the update address memory 32 according to the address (write-back address) at which the write-back is performed and the processor identifier 10 which performs write-back (step M2), and then decrements the dirty block counter by one (step M3). If the count value of the dirty block counter is made to be zero as a result of this decrement, the values of the R pointer and the W pointer are made to be the same and the fullness flag is turned off (step M5) so that all of the update addresses stored in the region are removed.

FIG. 27 is an operation diagram showing the process which is performed by the flush executing section 35. The flush executing section 35 follows a command issued from the processor 10 to issue, to the system bus 40, a command for requesting writing-back, into the main memory 51, of the contents of the dirty block having the address stored in each entry of a region having the dirty block counter, the value of which is not zero (step N3). When the count value of the dirty block counter is made to be zero (step N2), the process of the foregoing region is ended.

This embodiment has the structure such that, in addition to the structure according to the second embodiment, the dirty block counter is provided to correspond to the regions forming the update address memory 32 and the update address registering section 33 and the update address removing section 34 control the dirty block counter to correspond to increase/decrease of the dirty blocks. When all of the dirty blocks corresponding to a certain region are disappeared, the update address removing section 34 makes empty the entries of all of the foregoing regions.

As a result, the frequency of turning the entry reclaiming section 36 on can be lowered as compared with the second embodiment. Thus, the performance of the computer having the cache flush device 30 according to this embodiment.

Although means are added to the structure according to the second embodiment in the above description, the means may be added to the structure according to the third embodiment.

Although all of the entries of the corresponding region Ai are made to be empty when the dirty block counter is decremented to zero by the update address removing section 34 according to this embodiment, it might be considered feasible to employ the following second method of use of the dirty block counter.

It is assumed that the count value of the dirty block counter of the region Ai is made to be 1 as a result of the decrement operation. If the number (which can be calculated in accordance with the difference between the R pointer and the W pointer) of the update addresses stored in the region Ai is large, it means a fact that no dirty block exists with respect to substantially all update addresses stored in the region Ai.

If the entry reclaiming section 36 is applied to all of the entries of the region Ai, the number of issues of commands for requesting writing-back into the main memory 51 to the addresses in each of which no dirty block exists can be decreased. Therefore, improvement of the performance can be performed.

The first to fourth embodiments have been described with regard to the cache flush device. A fault tolerant computer employing one of the foregoing embodiments will now be described.

(Fifth Embodiment)

Figure 28:
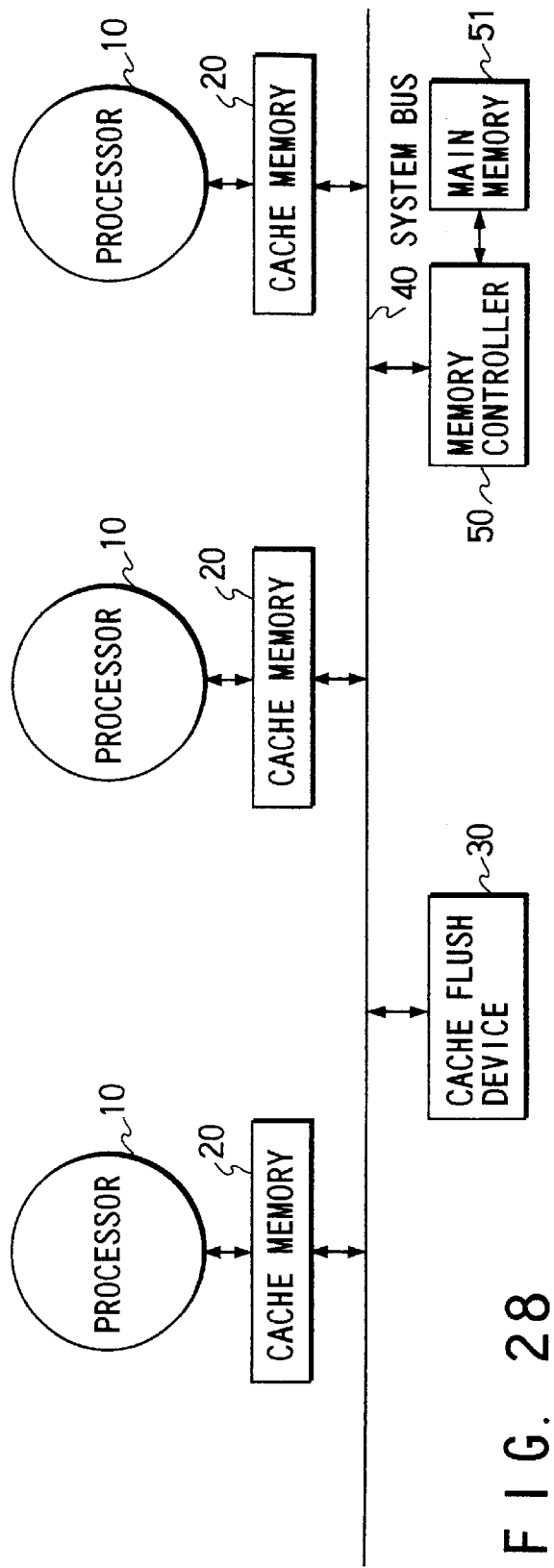
FIG. 28 is a diagram showing the structure of a fault tolerant computer according to a fifth embodiment of the present invention.

FIG. 28 shows a fifth embodiment of the present invention. The cache flush device 30 according to one of the first to fourth embodiments is connected to the system bus 40. Each of the processors 10 has a copy-back type cache memory 20 having a cache coherency function.

The computer according to this embodiment performs one of the three steps below so as to be capable of process data with excellent fault tolerant performance.

(1) Normal Data Processing Step

While causing the cache flush device 30 to acquire the update address, a normal data processing is performed.

(2) Checkpoint Acquisition Step

This step is periodically performed by temporarily interrupting the normal data processing step. In a case where a plurality of processors 10 are provided, all of the processors 10 are synchronized to perform this step. In this step, the two processes below are performed.

(2a) The context (the contents of the program counter, general-purpose register, and the like of the processor 10) of the processor 10, which is processing data, are stored in the main memory 51.

(2b) By turning the flush executing section 35 of the cache flush device 30 on, the contents of all of the dirty blocks are written-back into the main memory 51.

(3) Rollback & Recovery Step

This step is performed if a problem of the computer takes place during the normal data processing step or the checkpoint acquisition step. In this step, the two processes below are performed.

(3a) The main memory 51 is restored to the state of the checkpoint which is acquired immediately before the problem.

(3b) Information stored in the restored main memory 51 is used to restart the normal data processing (when the operation is restarted, the operation is shifted to the normal data processing step).

Figure 29:
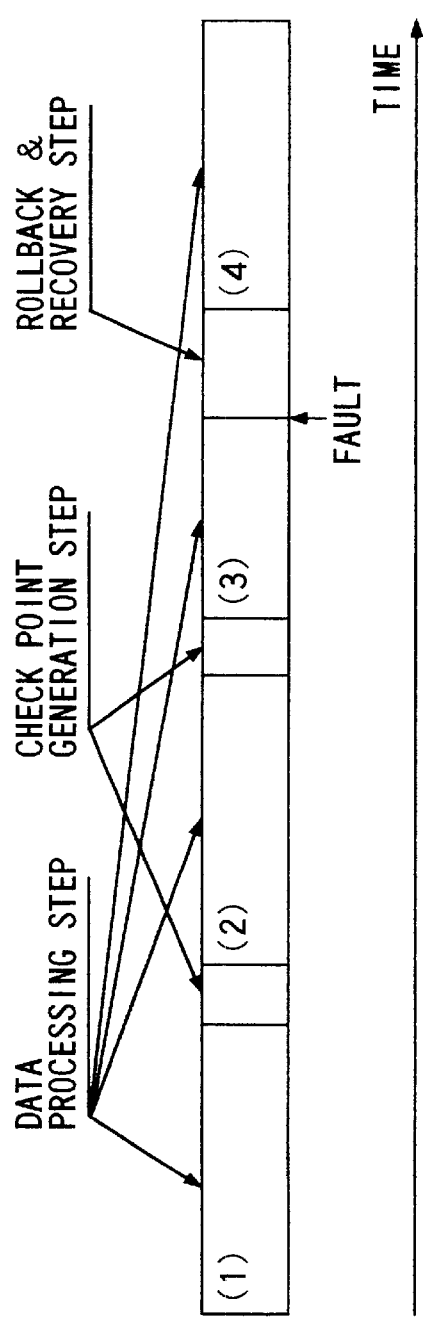
FIG. 29 is a diagram showing shift of three steps as the time elapses in the computer of the fifth embodiment.

FIG. 29 shows a state in which the shift among the three steps are denoted.

After a predetermined time has elapsed from start of the normal data processing step, each processor 10 starts the checkpoint acquisition step. In this checkpoint acquisition step, a first process is performed such that the progress of the process, that is, the context (the contents of the program counter, state register, the general purpose register and the like) of the processor when the normal data processing step is shifted to the checkpoint acquisition step is written into the main memory 51. However, it may simply be stored in the cache memory 20.

A second process is performed in the checkpoint acquisition step such that the contents of the dirty block are written-back into the main memory 51. The second process is required to restart the normal data processing by the rollback & recovery step from a state before a fault even in a case of the fault in which data in the cache memory 20 is destroyed takes place.

When the checkpoint acquisition step is ended, the normal data processing step is restarted. At this time, the context of the processor 10 written into the main memory 51 in the checkpoint acquisition step is used.

FIG. 29 shows a state where a fault takes place during a third data processing step and the rollback & recovery step is started. In the rollback & recovery step, a first process is performed such that the state of the main memory 51 is restored to the state where the latest checkpoint acquisition step is performed, that is, the state is restored to the state just before the third data processing step is started.

In general, write-back of the contents of the dirty block into the main memory 51 takes place any time, the state of the main memory 51 is slightly changed from the state when the normal data processing step is started. Accordingly, the state of the main memory 51 is restored to the state of the latest checkpoint as the first process of the rollback & recovery step. The restoration may be performed such that the contents of the main memory 51 before the write-back are stored in a log memory whenever write-back of the contents of the dirty block into the main memory 51 takes place and the contents are used to restore the state of the main memory 51.

When, for example, data D1 is written-back into address a, the memory controller 50 stores the write-back command and reads out the contents (D0) at address a of the main memory 51. Then, D1 is written to address a of the main memory 51. Then, a pair of address a and data D0 is stored. As the first process of the rollback & recovery step, D0 is written into the main memory 51 at the address a so that the state of the main memory 51 at the latest checkpoint is restored.

Another method may be employed in which the main memory 51 is duplicated as memory A and memory B. When write-back of the contents of the dirty block into the main memory 51 is performed in the normal data processing step, write-back to only the memory A is performed. The change in the memory A is adapted to the memory B in the checkpoint acquisition step. Thus, the restoration can be performed.

A second process of the rollback & recovery step is to restart the normal data processing step at the restored state of the main memory. The foregoing process is the same as the shift from the checkpoint acquisition step to the normal data processing step. In the case shown in FIG. 29, a fourth data processing step is started from the same state as the third data processing step.

In the rollback & recovery step, a process must be performed in which the cause of the fault is detected to separate the defective device. If a critical problem takes place, restart must be abandoned and the operation of the computer must be interrupted. Since this process is not the gist of the present invention, it is omitted from the further description.

Since the computer of the above type involves deterioration in the performance because of the periodical execution of the checkpoint acquisition step, the time required to perform the checkpoint acquisition step must be shortened. Since the major portion of the checkpoint acquisition step is to write-back the contents of the dirty block into the main memory 51, use of the cache flush device 30 according to the present invention enables the time required to perform the write-back to be shortened. Thus, the time required to complete the checkpoint acquisition step can significantly be shortened.

If the flush executing section 35 of the cache flush device 30 is turned on in the latter half portion of the normal data processing step, the time required to complete the checkpoint acquisition step can furthermore be shortened. The reason for this is that the number of the dirty blocks can considerably be reduced when the checkpoint acquisition step is started because the flush executing section 35 of the cache flush device 30 is turned on as compared with the case where the foregoing process is not performed. If the foregoing process is not performed, the probability of the dirty blocks can be lowered from, for example, 30% to about 15%. Since the flush executing section 35 of the cache flush device 30 according to one of the first to fourth embodiments is able to efficiently fetch the update address stored in the update address memory 32, the time required to complete the checkpoint acquisition step can be substantially be halved if the probability of the dirty blocks is 15%.

(Sixth Embodiment)

Figure 30:
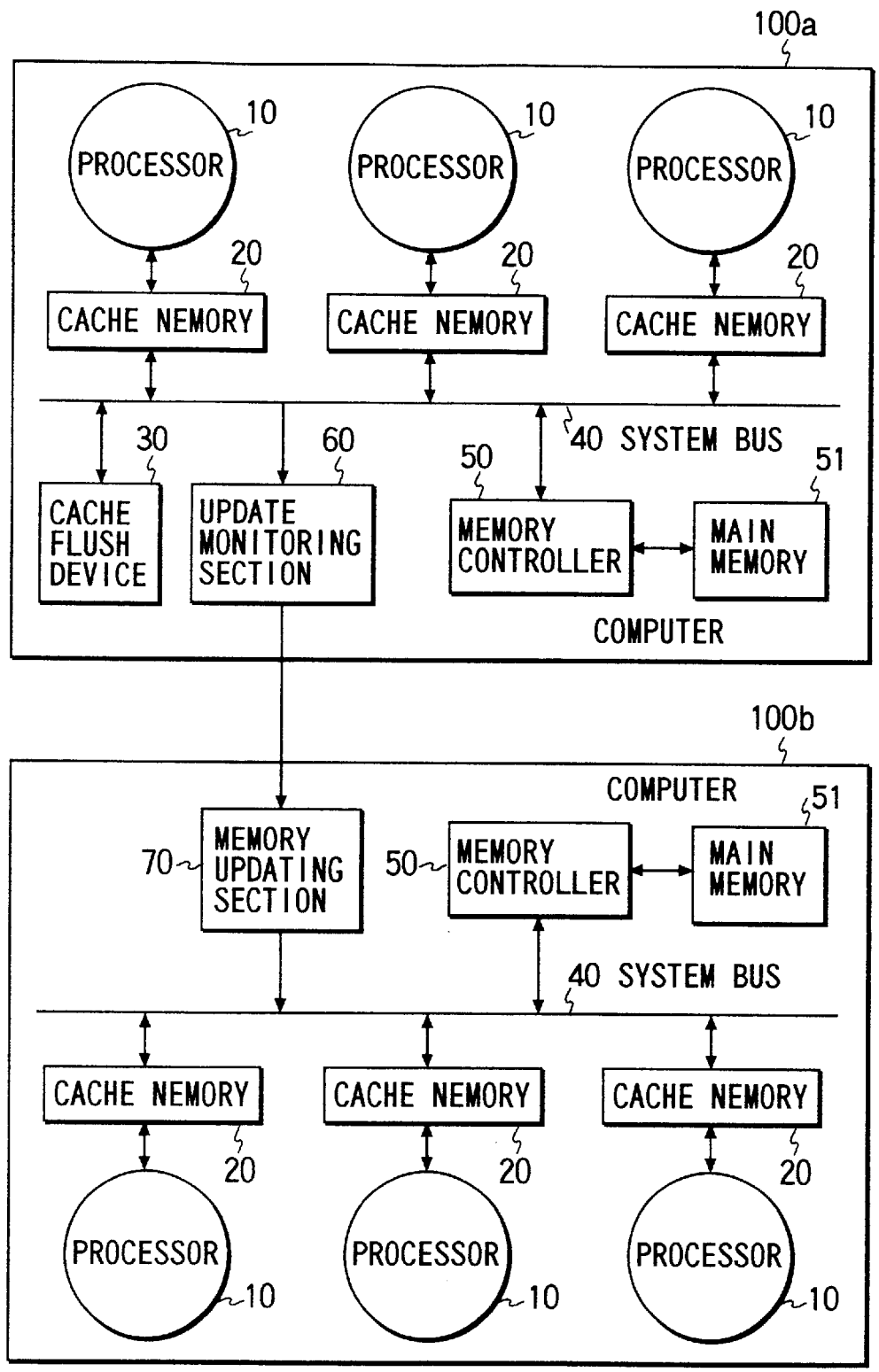
FIG. 30 is a diagram showing the structure of a fault tolerant computer according to a sixth embodiment of the present invention.

A sixth embodiment of the present invention will now be described. FIG. 30 shows the structure of a fault tolerant computer having the cache flush device 30 according to one of the first to fourth embodiments. As shown in FIG. 30, the computer according to this embodiment has a structure such that independent first and second computers 100a and 100b are connected to each other by an update monitor section 60 (in the first computer 100a) and a memory update section 70 (in the second computer 100b). The first computer 100a and the second computer 100b must comprise the same type processors 10 and the same type main memories 51.

The first computer 100a always performs the normal data processing step and the checkpoint acquisition step. On the other hand, the second computer 100b usually performs a waiting step and continuously performs the normal data processing which is performed by the first computer 100a if a fault takes place in the first computer 100a.

The update monitor section 60 monitors the system bus 40 of the first computer 100a to monitor and store commands generated in the first computer 100a and capable of updating the main memory 51. The update monitor section 60 follows a command issued from the first computer 100a to supply the stored commands to the memory update section 70 connected to the second computer 100b.

The memory update section 70 supplies the commands received from the update monitor section 60 to the system bus 40 of the second computer 100b so as to make coincide the state of the main memory 51 of the second computer 100b with that of the first computer 100a.

The normal data processing step and the checkpoint acquisition step of the first computer 100a will now be described.

(1) Normal data processing Step

While causing the cache flush device 30 to acquire the update address, the usual data processing is performed.

(2) Checkpoint Acquisition Step

This step is periodically performed in such a manner that the normal data processing step is temporarily interrupted. If a plurality of the processors 10 are provided, all of the processors 10 must be synchronized with one another. In this step, three processes below are performed.

(2a) The context (the contents of the program counter, a general purpose register and the like of the processor 10) of the processor 10, which is performing the data process, are stored in the main memory 51.

(2b) By turning the flush executing section 35 of the cache flush device 30 on, the contents of all of the dirty blocks are written-back into the main memory 51.

(2c) A command is issued to the update monitor section 60 to supply the stored commands to the memory update section 70.

In the waiting step of the second computer 100b, each of the processors 10 does not perform the normal data processing but examine whether or not main memory update commands are periodically supplied from the first computer 100a to the memory update section 70. If the command is not received for a period longer than a predetermined period, it is determined that the first computer 100a is brought to an operation inhibited state. Thus, the normal data processing is performed in the state of the main memory 51 of the second computer 100b at the foregoing moment.

Figure 31:
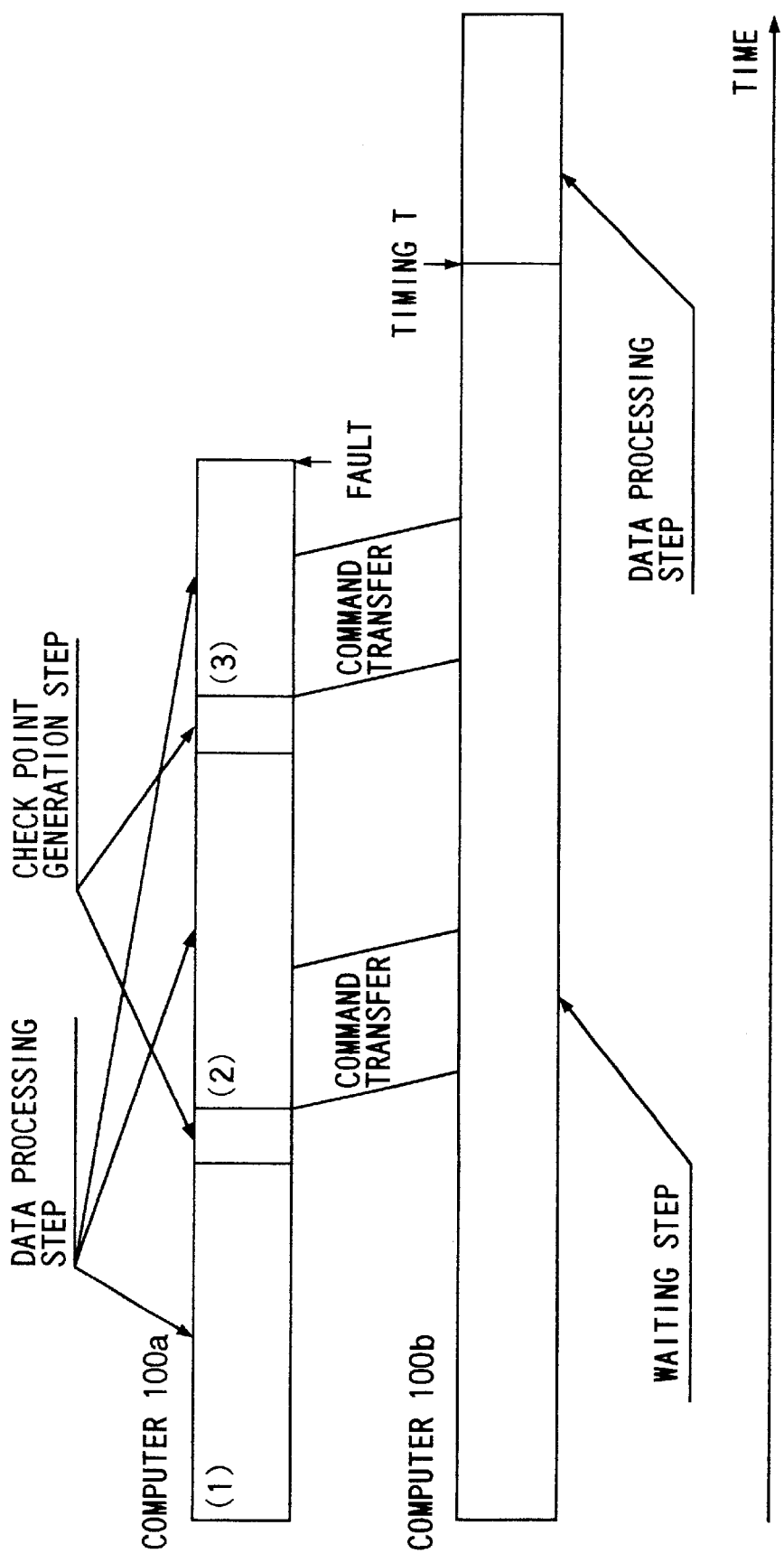
FIG. 31 is a diagram showing states of changes of a first computer 100a and a second computer 100b of the computer of the sixth embodiment as the time elapses.

FIG. 31 shows a state of the computer according to this embodiment in which the states of the first computer 100a and the second computer 100b are changed as the time elapses.

After a predetermined time has elapsed from start of the normal data processing step, each processor 10 of the first computer 100a starts the checkpoint acquisition step. In this checkpoint acquisition step, a first process is performed such that the progress of the process, that is, the context (the contents of the program counter, state register, the general purpose register and the like) of the processor when the normal data processing step is shifted to the checkpoint acquisition step is written into the main memory 51. However, it may simply be stored in the cache memory 20.

A second process of the checkpoint acquisition step is to write-back the contents of the dirty block into the main memory 51. The second process is required to supply all of updated contents of the main memory 51 in the first computer 100a to the second computer 100b.

A third process of the checkpoint acquisition step is performed such that a command is issued to the update monitor section 60 to supply the stored commands to the memory update section 70. It is preferable that the command be issued immediately before end of the checkpoint acquisition step. The reason for this is that the second computer 100b must always store a correct main memory image.

After the checkpoint acquisition step is ended, the normal data processing step is restarted. At this time, the context of the processor 10 written into the main memory 51 in the checkpoint acquisition step is used.

FIG. 31 shows a state where a fault is generated during the third data processing step. At this time, the first computer 100a is required to simply interrupt the operation thereof. As an alternative to this, start up may be performed to make provision for a fault of the second computer 100b.

The second computer 100b performs the wait step until a fault generates in the first computer 100a. At timing T, it is determined that the memory update section 70 does not receive a command from the update monitor section 60 for a predetermined time and the normal data processing step is performed. In the case shown in FIG. 31, the normal data processing step is, in the second computer 100b, started in the same state as the third data processing step of the first computer 100a.

Since the computer of above type involves deterioration in the performance because of the periodical execution of the checkpoint acquisition step, the time required to perform the checkpoint acquisition step must be shortened. Since the major portion of the checkpoint acquisition step is to write-back the contents of the dirty block into the main memory 51, use of the cache flush device 30 enables the time required to perform the write-back to be shortened significantly.

If the flush executing section 35 of the cache flush device 30 is turned on in the latter half portion of the normal data processing step, the time required to complete the checkpoint acquisition step can furthermore be shortened similarly to the fifth embodiment.

As described above, the cache flush device according to the present invention causes the addresses of all of the dirty blocks on the cache memory to be stored in one of the regions in the cache flush device. If a certain cache block is brought to the dirty state and then suspended from the dirty state, the address is removed from the region. The flush execution portion issues the command for sequentially fetching the addresses of the dirty blocks from each region and writing-back the contents of the dirty block at the address into the main memory so that the contents of all of the dirty blocks are written-back into the main memory.

As a result, the process as is required for the conventional software to sequentially determine all of the cache blocks whether or not the cache block is the dirty block can be omitted. Therefore, the cache flush procedure can quickly and efficiently be performed.

Even if the processor has the write buffer and each region has only one entry, only the address (the latest update address) of data stored in the cache block in place of the write buffer is stored in the foregoing entry so that an appropriate cache flush procedure is performed.

Moreover, a mechanism for issuing a command for writing-back the update address to be adaptable to the state of use of the region is provided so that the number of entries of the region of the update address storage portion is considerably freely be set and the regions and the addresses are made coincide with one another significantly freely.

Since the computer system according to the present invention is able to quickly and efficiently perform the cache flush procedure which is the major portion of the checkpoint acquisition step, the performance of the system can be improved.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A cache flush apparatus for use in a computer having at least one processor provided with a copy-back type cache memory having a bus snoop mechanism, a main memory and a system bus for connecting said at least one processor and said main memory, said cache flush apparatus comprising:

update address storage means having a plurality of regions each of which has one or more entries for storing the address of data held in a dirty block;

update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back and removing the update address which is equal to the memory address MW and is stored in an entry of the selected region; and flush executing means, in response to a request from said at least one processor, for issuing, to said system bus, a command for sequentially reading all update addresses stored in said update address storage means and writing-back into said main memory the data of the dirty block indicated by the update address read.

2. A cache flush apparatus according to claim 1, in which the plural regions of said update address store means can be selected by the update address.

3. A cache flush apparatus for use in a computer having at least one processor provided with a copy-back type and direct map cache memory having a bus snoop mechanism, a main memory and a system bus for connecting said at least one processor and said main memory, said cache flush apparatus comprising:

update address storage means having a plurality of regions each of which corresponds to a cache block and has one entry for storing the memory address of data held in the corresponding cache block if the cache block's state is dirty;

update address registering means for monitoring said system bus to detect an update of data within said cache memory, selecting a region of said update address storage means according to a memory address MU at which the data has been updated and an identifier of a processor which has updated the data and storing the memory address MU as an update address in the entry of the selected region;

update address removing means for monitoring said system bus to detect a write-back of data from a dirty block, selecting a region of said update address storage means according to a memory address MW at which the data has been written back and an identifier of a processor from which the data has been written back, comparing the update address stored in the entry of the selected region with the write-back address and if they are the same, removing the update address; and flush executing means, in response to a request from said at least one processor, for issuing commands to said system bus each of which has the update address stored in the entry of a region and causes a write-back of data from the dirty block designated by the update address.

4. A cache flush apparatus for use in a computer having at least one processor provided with a copy-back type and direct map cache memory having a bus snoop mechanism, a main memory and a system bus for connecting said at least one processor and said main memory, said cache flush apparatus comprising:

update address storage means having a plurality of regions each of which corresponds to a cache block and has one entry and one counter;

update address registering means for monitoring said system bus to detect an update of data within said cache memory, selecting a region of said update address storage means according to a memory address MU at which the data has been updated and an identifier of a processor which has updated the data, storing the memory address MU as an update address in the entry of the selected region, and incrementing the counter of the selected region;

update address removing means for monitoring said system bus to detect a write-back of data from a dirty block, selecting a region of said update address storage means according to a memory address MW at which the data has been written back and an identifier of a processor from which the data has been written back, and decrementing the counter of the selected region; and flush executing means, in response to a request from said at least one processor, for issuing bus commands to said system bus each of which has the update address stored in the entry of a region with a non-initial counter value and causes a write-back of data from the dirty block designated by the update address.

5. A cache flush apparatus for use in a computer having at least one processor provided with a copy-back type cache memory having a bus snoop mechanism, a main memory and a system bus for connecting said at least one processor and said main memory, said cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back and removing the update address in the selected region which coincides with the written-back address stored; and update address reading means for sequentially reading all of the update addresses stored in said update address storage means in order to make the update addresses be read by said at least one processor.

6. A cache flush apparatus for use in a computer having at least one processor provided with a copy-back type and direct map cache memory having a bus snoop mechanism, a main memory and a system bus for connecting said at least one processor and said main memory, said cache flush apparatus comprising:

update address storage means having a plurality of regions provided to correspond to cache blocks provided in said cache memory for storing an address of data stored in a dirty block which is a cache block among cache blocks and which stores data which must be written-back into said main memory, each region having one entry;

update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back, comparing the update address stored in the entry of the selected region with the write-back address, and if they are the same removing the update address from the entry; and update address reading means for sequentially reading all of the update addresses stored in said update address storage means in order to make the update addresses be read by said at least one processor.

7. A cache flush apparatus for use in a computer having at least one processor provided with a copy-back type and direct map cache memory having a bus snoop mechanism, a main memory and a system bus for connecting said at least one processor and said main memory, said cache flush apparatus comprising:

update address storage means having a plurality of regions provided to correspond to cache blocks provided in said cache memory for storing an address of data stored in a dirty block which is a cache block among cache blocks which stores data which must be written-back into said main memory, each region having one entry and one counter;

update address registering means for monitoring said system bus to detect an update of data within said cache memory, selecting a region of said update address storage means according to a memory address MU at which the data has been updated and an identifier of a processor which has updated the data, storing the memory address MU as an update address in one of the entries of the selected region, and incrementing said counter corresponding to the selected region;

update address removing means for monitoring said system bus to detect a write-back of data from a dirty block, selecting a region of said update address storage means according to a memory address MW at which the data has been written back and an identifier of a processor from which the data has been written back, and decrementing said counter corresponding to the selected region; and update address reading means for sequentially reading update addresses stored in regions among the plural regions of said update address storage means for which a counter value is not an initial value and making the update addresses be read by said at least one processor.

8. A cache flush apparatus for use in a computer having at least one processor provided with a copy-back type cache memory having a bus snoop mechanism, a main memory and a system bus for connecting said at least one processor and said main memory, said cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;

entry reclaiming means for comparing the number of empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the selected entry from "stuffed" to "empty"; and flush executing means, in response to a request from said at least one processor, for issuing bus commands to said system bus each of which has one of the update addresses stored in said update address storage means and causes a write-back of data from the dirty block designated by the update address.

9. A cache flush apparatus according to claim 8, in which said cache memory is an n-way set-associative type memory, and said plural regions of said update address storage means are provided to, one-to-one, correspond to groups each of which is formed by n cache blocks.

10. A cache flush apparatus according to claim 8, in which the number of entries of each of the plural regions of said update address storage means is smaller than the number of the corresponding cache blocks.

11. A cache flush apparatus according to claim 8, in which the plural regions of said update address storage means can be selected by the update address.

12. A cache flush apparatus according to claim 8, in which said update address storage means comprises a dirty block counter for storing a number of dirty blocks corresponding to the regions storing an address of data which is stored as a dirty block; and said update address registering means comprises means for incrementing said dirty block counter corresponding to the selected region, and characterized by further comprising:

decrement means for monitoring said system bus to detect a write-back of data from a dirty block, selecting a region of said update address storage means according to the memory address MW at which the data has been written back and the identifier of the processor from which the date has been written back, and decrementing the dirty block counter of the selected region; and entry reclaiming means, when the value of a dirty block counter is made to an initial value as a result of a decrement performed by said decrement means, for making all the entries of the selected region empty.

13. A cache flush apparatus according to claim 12, in which said entry reclaiming means, when the number of the update addresses stored in one of the plural regions of said update address storage means is larger than the count value of said dirty block counter corresponding to the region, selects one of the update addresses already stored in the region, issues a command for writing-back of data stored in the dirty block indicated by the selected update address into said main memory, and makes the entry in which the update address is stored to be an empty entry.

14. A cache flush apparatus for use in a computer having at least one processor provided with a copy-back type cache memory having a bus snoop mechanism, a main memory and a system bus for connecting said at least one processor and said main memory, said cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back, detecting, for a predetermined time, whether or not an update address which coincides with the write-back address exists in the selected region, and removing the update address which coincides with the write-back address;

entry reclaiming means for comparing the number of the empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the selected entry from "stuffed" to "empty"; and flush executing means, in response to a request from said at least one processor, for issuing bus commands to said system bus each of which has one of the update addresses stored in said update address storage means and causes a write-back of data from the dirty block designated by the update address.

15. A cache flush apparatus according to claim 14, in which said update address removing means, upon detecting that a cache block storing data of a given address is not a dirty block, selects one of the plural regions of said update address storage means based on the given address and, when it detects an update command coincides with the update address in the selected region, removes the update address.

16. A cache flush apparatus according to claim 14, in which the number of entries of each of the plural regions of said update address storage means is smaller than the number of the corresponding cache blocks.

17. A cache flush apparatus according to claim 14, in which the plural regions of said update address storage means can be selected by the update address.

18. A cache flush apparatus according to claim 14, in which said update address storage means comprises a dirty block counter for storing a number of dirty blocks corresponding to the regions storing an address of data which is stored as a dirty block;

said update address registering means comprises means for incrementing said dirty block counter corresponding to the selected region;

said update address removing means comprises means for decrementing said dirty block counter corresponding to the selected region, and characterized by further comprising:

removing means for removing all of the update addresses stored in the region corresponding to said dirty block counter when said dirty block counter is made to be an initial value as a result of a decrement performed by said decrement means.

19. A cache flush apparatus for use in a computer having at least one processor provided with a copy-back type cache memory having a bus snoop mechanism, a main memory and a system bus for connecting said at least one processor and said main memory, said cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block into said main memory, selecting a region of said update address storage means according to a memory address MW at which the data has been written back and an identifier of a processor from which the data has been written back, determining whether or not an update address which coincides with the write-back address exists in the selected region until said cache flush apparatus detects a command which must be processed next, and removing the update address when an update address which coincides with the write-back address is detected;

entry reclaiming means for comparing a number of empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the selected entry from "stuffed" to "empty"; and flush executing means, in response to a request from said at least one processor, for issuing bus commands to said system bus each of which has one of the update addresses stored in said update address storage means and causes a write-back of data from the dirty block designated by the update address.

20. A cache flush apparatus according to claim 19, in which when said update address removing means detects a command indicating that all cache blocks for storing data indicated by a certain address are not dirty blocks, said update address removing means selects one of the plural regions of said update address storage means in accordance with the certain address, retrieves the selected region, and removes the update address when an update address which coincides with the write-back address is detected.

21. A cache flush apparatus according to claim 19, in which the number of entries of each of the plural regions of said update address storage means is smaller than the number of the corresponding cache blocks.

22. A cache flush apparatus according to claim 19, in which the plural regions of said update address storage means can be selected by the update address.

23. A cache flush apparatus according to claim 19, in which said update address storage means comprises a dirty block counter for storing a number of dirty blocks corresponding to the regions storing an address of data which is stored as a dirty block;

said update address registering means comprises means for incrementing said dirty block counter corresponding to the selected regions;

said update address removing means comprises means for decrementing said dirty block counter corresponding to the selected region, and characterized by further comprising:

removing means for removing all of the update addresses stored in the region corresponding to said dirty block counter when said dirty block counter is made to be an initial value as a result of a decrement performed by said decrement means.

24. A computer system having processors provided with a copy-back type cache memory having a bus snoop mechanism, a main memory and a system bus for connecting said processors and said main memory and arranged to periodically extract a checkpoint for restarting an interrupted process, comprising:

a cache flush apparatus comprising:
  update address storage means having a plurality of regions each of which has one or more entries for storing the addresses of data held in dirty blocks;
  update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;
  update address removing means for monitoring said system bus to detect a write-back of data from a dirty block, selecting a region of said update address storage means according address MW at which the data has been written back and an identifier of a processor from which the data has been written back and removing the update address which is equal to the memory address stored in an entry of the selected region; and
  flush executing means, in response to a request from any of said processors, for issuing, to said system bus, a command for sequentially reading all update addresses stored in said update address storage means and writing-back into said main memory the data of the dirty block indicated by the update address read;
normal data processing means for performing normal data processing while causing said cache flush apparatus to acquire an update address;
checkpoint acquisition means including means for storing into said main memory the context of a data process which is synchronously performed by said processors and writing-back, into said main memory, of data stored in all of the dirty blocks by said flush executing means of said cache flush apparatus; and
rollback & recovery means for restoring said main memory to a previous checkpoint when a fault has taken place and using information stored in said restored main memory to restart the normal data processing.

25. A computer system according to claim 24, in which the plural regions of said update address storage means can be selected by the update address.

26. A computer system having processors provided with a copy-back type cache memory having a bus snoop mechanism, a main memory and a system bus for connecting said processors and said main memory and arranged to periodically extract a checkpoint for restarting an interrupted process, comprising:
  a cache flush apparatus comprising:
    update address storage means having a plurality of regions provided to correspond to cache blocks provided in said cache memory for storing an address of data stored in a dirty block, each region having one entry;
    update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;
    update address removing means for monitoring said system bus to detect a write-back of data from a dirty block, selecting a region of said update address storage means according to a memory address MW at which the data has been written back and an identifier of a processor from which the data has been written back, comparing the update address stored in the entry of the selected region with the write-back address and if they are the same, removing the update address from the entry; and
    flush executing means, in response to a request from any of said processors, for issuing, to said system bus, a command for sequentially reading all update addresses stored in said update address storage means and writing-back into said main memory data of the dirty block indicated by the update address read;
  normal data processing means for performing normal data processing while causing said cache flush apparatus to acquire an update address;
  checkpoint acquisition means including means for storing into said main memory the context of a data process which is synchronously performed by said processors and writing-back, into said main memory, of data stored in all of the dirty blocks by said flush executing means of said cache flush apparatus; and
  rollback & recovery means for restoring said main memory to a previous checkpoint when a fault has taken place and using information stored in said restored main memory to restart the normal data processing.

27. A computer system having processors provided with a copy-back type cache memory having a bus snoop mechanism, a main memory and a system bus for connecting said processors and said main memory and arranged to periodically extract a checkpoint for restarting an interrupted process, comprising:
  a cache flush apparatus comprising:
    update address storage means having a plurality of regions provided to correspond to cache blocks provided in said cache memory for storing an address of data stored in a dirty block, each region having one entry and one counter;
    update address registering means for monitoring said system bus to detect an update of data within said cache memory, selecting a region of said update address storage means according to a memory address MU at which the data has been updated and an identifier of a processor which has updated the data, storing the memory address MU as an update address in one of the entries of the selected region, and incrementing said counter corresponding to the selected region;
    update address removing means for monitoring said system bus to detect a write-back of data from a dirty block, selecting a region of said update address storage means according to a memory address MW at which the data has been written back and an identifier of a processor from which the data has been written back, and decrementing said counter corresponding to the selected region; and
    flush executing means, in response to a request from any of said processors, for issuing, to said system bus, a command for sequentially reading update addresses stored in regions among the regions of said update address storage means of which count value is not an initial value, and writing-back into said main memory data of the dirty block indicated by the update address read;

normal data processing means for performing normal data processing while causing said cache flush apparatus to acquire an update address;

checkpoint acquisition means including means for storing into said main memory the context of a data process which is synchronously performed by said processors and writing-back, into said main memory, of data stored in all of the dirty blocks by said flush executing means of said cache flush apparatus; and rollback & recovery means for restoring said main memory to a previous checkpoint when a fault has taken place and using information stored in said restored main memory to restart the normal data processing.

28. A computer system having processors provided with a copy-back type cache memory having a bus snoop mechanism, a main memory and a system bus for connecting said processors and said main memory and arranged to periodically extract a checkpoint for restarting an interrupted process, comprising:

a cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated an identifier of a processor which has updated the data and storing the memory address MU as an update address in one of the entries of the selected region; and flush executing means, in response to a request from any of said processors, for issuing bus commands to said system bus each of which has one of the update addresses stored in said update address storage means and causes a write-back of data from the dirty block designated by the update address;

normal data processing means for performing normal data processing while causing said cache flush apparatus to acquire an update address;

checkpoint acquisition means including means for storing into said main memory the context of a data process which is synchronously performed by said processors and writing-back, into said main memory, of data stored in all of the dirty blocks by said flush executing means of said cache flush apparatus; and rollback & recovery means for restoring said main memory to a previous checkpoint when a fault has taken place and using information stored in said restored main memory to restart the normal data processing.

29. A computer system according to claim 28, in which said cache memory is an n-way set-associative type memory, and said plural regions of said update address storage means are provided to, one-to-one, correspond to groups each of which is formed by n cache blocks.

30. A computer system according to claim 28, in which the number of entries of each of the plural regions of said update address storage means is smaller than the number of the corresponding cache blocks.

31. A computer system according to claim 28, in which the plural regions of said update address storage means can be selected by the update address.

32. A computer system according to claim 28, in which said update address storage means comprises a dirty block counter for storing a number of dirty blocks corresponding to the regions storing an address of data which is stored as a dirty block; and said update address registering means comprises means for incrementing said dirty block counter corresponding to the selected region, and characterized by further comprising:

decrement means for monitoring said system bus to detect a write-back of data from a dirty block, selecting a region of said update address storage means according to the memory address MW at which the data has been written back and the identifier of the processor from which the date has been written back, and decrementing the dirty block counter of the selected region; and entry reclaiming means, when the value of a dirty block counter is made to an initial value as a result of a decrement performed by said decrement means, for making all the entries of the selected region empty.

33. A computer system according to claim 32, in which said entry reclaiming means, when the number of the update addresses stored in one of the plural regions of said update address storage means is larger than the count value of said dirty block counter corresponding to the region, selects one of the update addresses already stored in the region, issues a command for write-back of data stored in the dirty block indicated by the selected update address into said main memory, and makes the entry in which the update address is stored to be an empty entry.

34. A computer system having processors provided with a copy-back type cache memory having a bus snoop mechanism, a main memory and a system bus for connecting said processors and said main memory and arranged to periodically extract a checkpoint for restarting an interrupted process, comprising:

a cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated an identifier of a processor which has updated the data, and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back, detecting, for a predetermined time, whether or not an update address which coincides with the write-back address exists in the selected region, and removing the update address which coincides with the write-back address;

entry reclaiming means for comparing the number of empty entries of the region selected by said update address registering means with a predetermined value, selecting a stuffed entry of the selected region if the number of the empty entries is smaller than the predetermined value, issuing a bus command which causes a write-back of data stored in the cache block designated by the update address of the entry, and changing the state of the entry from "stuffed" to "empty"; and flush executing means, in response to a request from any of said processors, for issuing bus commands to said system bus each of which has one of the update addresses stored in said update address storage means and causes a write-back of data from the dirtyblock designated by the update address;

normal data processing means for performing normal data processing while causing said cache flush apparatus to acquire an update address;

checkpoint acquisition means including means for storing into said main memory the context of a data process which is synchronously performed by said processors and writing-back, into said main memory, of data stored in all of the dirty blocks by said flush executing means of said cache flush apparatus; and rollback & recovery means for restoring said main memory to a previous checkpoint when a fault has taken place and using information stored in said restored main memory to restart the normal data processing.

35. A computer system according to claim 34, in which said update address removing means, upon detecting that a cache block storing data of a given address is not a dirty block, selects one of the plural regions of said update address storage means based on the given address and, when it detects an update command coincides with the update address in the selected region, removes the update address.

36. A computer system according to claim 34, in which the number of entries of each of the plural regions of said update address storage means is smaller than the number of the corresponding cache blocks.

37. A computer system according to claim 34, in which the plural regions of said update address storage means can by selected by the update address.

38. A computer system according to claim 34, in which said update address storage means comprises a dirty block counter for storing a number of dirty blocks corresponding to the regions storing an address of data which is stored as a dirty block;

said update address registering means comprises means for incrementing said dirty block counter corresponding to the selected region;

said update address removing means comprises means for decrementing said dirty block counter corresponding to the selected region, and characterized by further comprising:

removing means for removing all of the update addresses stored in the region corresponding to said dirty block counter when said dirty block counter is made to be an initial value as a result of a decrement performed by said decrement means.

39. A computer system having processors provided with a copy-back type cache memory having a bus snoop mechanism, a main memory and a system bus for connecting said processors and said main memory and arranged to periodically extract a checkpoint for restarting an interrupted process, comprising:

a cache flush apparatus comprising:

update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block into said main memory, selecting a region of said update address storage means according to a memory address MW at which the data has been written back and an identifier of a processor from which the data has been written back, determining whether or not an update address which coincides with the write-back address exists in the selected region until said cache flush apparatus detects a command which must be processed next, and removing the update address when an update address which coincides with the write-back address is detected;

entry reclaiming means for comparing a number of empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the entry from "stuffed" to "empty"; and flush executing means, in response to a request from any of said processors, for issuing bus commands to said system bus each of which has one of the update addresses stored in said update address storage means and causes a write-back of data from the dirty block designated by the update address;

normal data processing means for performing normal data processing while causing said cache flush apparatus to acquire an update address;

checkpoint acquisition means including means for storing into said main memory the context of a data process which is synchronously performed by said processors and writing-back, into said main memory, of data stored in all of the dirty blocks by said flush executing means of said cache flush apparatus; and rollback & recovery means for restoring said main memory to a previous checkpoint when a fault has taken place and using information stored in said restored main memory to restart the normal data processing.

40. A computer system according to claim 39, in which when said update address removing means detects a command indicating that all cache blocks for storing data indicated by a certain address are not dirty blocks said update address removing means selects one of the plural regions of said update address storage means in accordance with the certain address, retrieves the selected region, and removes the update address when an update address which coincides with the write-back address is detected.

41. A computer system according to claim 39, in which the number of entries of each of the plural regions of said update address storage means is smaller than the number of the corresponding cache blocks.

42. A computer system according to claim 39, in which the plural regions of said update address storage means can be selected by the update address.

43. A computer system according to claim 39, in which
said update address storage means comprises a dirty block counter for storing a number of dirty blocks corresponding to the regions storing an address of data which is stored as a dirty block;
said update address registering means comprises means for incrementing said dirty block counter corresponding to the selected regions;
said update address removing means comprises means for decrementing said dirty block counter corresponding to the selected region, and characterized by further comprising:
removing means for removing all of the update addresses stored in the region corresponding to said dirty block counter when said dirty block counter is made to be an initial value as a result of a decrement performed by said decrement means.

44. A computer system having processors provided with a copy-back type cache memory having a bus snoop mechanism, a main memory and a system bus for connecting said processors and said main memory and arranged to periodically extract a checkpoint for restarting an interrupted process, comprising:
a cache flush apparatus comprising:
update address storage means having a plurality of regions each of which has one or more entries for storing the addresses of data held in dirty blocks;
update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;
update address removing means for monitoring said system bus to detect a write-back of data from a dirty block, selecting a region of said update address storage means according to a memory address MW at which the data has been written back and an identifier of a processor from which the data has been written back and removing the update address in the selected region which coincides with the written-back address stored; and
update address reading means for sequentially reading all of the update addresses stored in said update address storage means in order to make the update addresses be read by said processors;
normal data processing means for performing normal data processing while causing said cache flush apparatus to acquire an update address;
checkpoint acquisition means including means for storing into said main memory the context of a data process which is synchronously performed by said processors and writing-back, into said main memory, of data stored in all of the dirty blocks by obtaining the update address through said update address reading means of said cache flush apparatus and by performing a command for writing-back data indicated by the identified update address from said cache memory into said main memory; and
rollback & recovery means for restoring said main memory to a previous checkpoint when a fault has taken place and using information stored in said restored main memory to restart the normal data processing.

45. A computer system having processors provided with a copy-back type cache memory having a bus snoop mechanism, a main memory and a system bus for connecting said processors and said main memory and arranged to periodically extract a checkpoint for restarting an interrupted process, comprising:
a cache flush apparatus comprising:
update address storage means having a plurality of regions provided to correspond to cache blocks provided in said cache memory for storing an address of data stored in a dirty block which is a cache block among cache blocks and which stores data which must be written-back into said main memory, each region having one entry;
update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;
update address removing means for monitoring said system bus to detect a write-back of data from a dirty block, selecting a region of said update address storage means according to a memory address MW at which the data has been written back and an identifier of a processor from which the data has been written back, the update address stored in the entry of the selected region with the write-back address, and if they are the same removing the update address from the entry; and
update address reading means for sequentially reading all of the update addresses stored in said update address storage means in order to make the update addresses be read by said processors;
normal data processing means for performing normal data processing while causing said cache flush apparatus to acquire an update address;
checkpoint acquisition means including means for storing into said main memory the context of a data process which is synchronously performed by said processors and writing-back, into said main memory, of data stored in all of the dirty blocks by obtaining the update address through said update address reading means of said cache flush apparatus and by performing a command for writing-back data indicated by the identified update address from said cache memory into said main memory; and
rollback & recovery means for restoring said main memory to a previous checkpoint when a fault has taken place and using information stored in said restored main memory to restart the normal data processing.

46. A computer system having processors provided with a copy-back type cache memory having a bus snoop mechanism, a main memory and a system bus for connecting said processors and said main memory and arranged to periodically extract a checkpoint for restarting an interrupted process, comprising:
a cache flush apparatus comprising:
update address storage means having a plurality of regions provided to correspond to cache blocks provided in said cache memory for storing an address of data stored in a dirty block which is a cache block among cache blocks which stores data which must be written-back into said main memory, each region having one entry and one counter;

update address registering means for monitoring said system bus to detect an update of data within said cache memory, selecting a region of said update address storage means according to a memory address MU at which the data has been updated and an identifier of a processor which has updated the data, storing the memory address MU as an update address in one of the entries of the selected region, and incrementing said counter corresponding to the selected region;

update address removing means for monitoring said system bus to detect a write-back of data from a dirty block, selecting a region of said update address storage means according to a memory address MW at which the data has been written back and an identifier of a processor from which the data has been written back, and decrementing said counter corresponding to the selected region; and update address reading means for sequentially reading update addresses stored in regions among the plural regions of said update address storage means for which a counter value is not an initial value and making the update addresses be read by said processors;

normal data processing means for performing normal data processing while causing said cache flush apparatus to acquire an update address;

checkpoint acquisition means including means for storing into said main memory the context of a data process which is synchronously performed and writing-back, into said main memory, of data stored in all of the dirty blocks by obtaining the update address through said update address reading means of said cache flush apparatus and by performing a command for writing-back data indicated by the identified update address from said cache memory into said main memory; and rollback & recovery means for restoring said main memory to a previous checkpoint when a fault has taken place and using information stored in said restored main memory to restart the normal data processing.

47. A computer system having at least first and second computers and arranged to periodically extract a checkpoint for restarting an interrupted process, the system comprising:

memory update monitoring means for acquiring a write command generated in said first computer, storing the write command to a main memory and transmitting a stored command to said second computer when it is instructed by said first computer; and memory update means for receiving the command transmitted by said memory update monitoring means to issue a write command, similar to that for said first computer, into a main memory of said second computer, wherein said first computer comprises:
a plurality of processors and a system bus;
a cache flush apparatus comprising:
update address storage means having a plurality of regions each of which has one or more entries for storing the addresses of data held in dirty blocks;
update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back and removing the update address which is equal to the memory address stored in an entry of the selected region; and flush executing means, in response to a request from any of said processors for issuing, to said system bus, a command for sequentially reading all update addresses stored in said update address storage means and writing-back into said main memory the data of the dirty block indicated by the update address read;

normal data processing means for performing normal data processing while causing said cache flush apparatus to acquire an update address;

checkpoint acquisition means including means for storing into said main memory the context of a data process which is synchronously performed and writing-back, into said main memory, data stored in all of the dirty blocks performed by said flush executing means of said cache flush apparatus, and issuing a command for transmitting the stored commands to said second computer; and said second computer comprises waiting means for starting the normal data processing when said memory update means does not receive a command from said memory update monitoring means.

48. A computer system according to claim 47, in which the plural regions of said update address storage means can be selected by the update address.

49. A computer system having at least first and second computers and arranged to periodically extract a checkpoint for restarting an interrupted process, the system comprising:

memory update monitoring means for acquiring a write command generated in said first computer, storing the write command to a main memory and transmitting a stored command to said second computer when it is instructed by said first computer; and memory update means for receiving the command transmitted by said memory update monitoring means to issue a write command, similar to that for said first computer, into a main memory of said second computer, wherein said first computer comprises:
a plurality of processors and a system bus;
a cache flush apparatus comprising:
update address storage means having a plurality of regions provided to correspond to cache blocks provided in said cache memory for storing an address of data stored in a dirty block, each region having one entry;
update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back, comparing the update address stored in the entry of the selected region with the write-back address and removing the update address stored in the selected region when the update address and the memory address are the same; and flush executing means, in response to a request from any of said processors, for issuing, to said system bus, a command for sequentially reading all of update addresses stored in said update address storage means and writing-back into said main memory data of the dirty block indicated by the update address read;

normal data processing means for performing normal data processing while causing said cache flush apparatus to acquire an update address;

checkpoint acquisition means including means for storing into said main memory the context of a data process which is synchronously performed and writing-back, into said main memory, data stored in all of the dirty blocks performed by said flush executing means of said cache flush apparatus, and issuing a command for transmitting the stored commands to said second computer; and said second computer comprises waiting means for starting the normal data processing when said memory update means does not receive a command from said memory update monitoring means.

50. A computer system having at least first and second computers and arranged to periodically extract a checkpoint for restarting an interrupted process, the system comprising:

memory update monitoring means for acquiring a write command generated in said first computer, storing the write command to a main memory and transmitting a stored command to said second computer when it is instructed by said first computer; and memory update means for receiving the command transmitted by said memory update monitoring means to issue a write command, similar to that for said first computer, into a main memory of said second computer, wherein said first computer comprises:
a plurality of processors and a system bus;
a cache flush apparatus comprising:
update address storage means having a plurality of regions provided to correspond to cache blocks provided in said cache memory for storing an address of data stored in a dirty block, each region having one entry and one counter;

update address registering means for monitoring said system bus to detect an update of data within said cache memory, selecting a region of said update address storage means according to a memory address MU at which the data has been updated and an identifier of a processor which has updated the data, storing the memory address MU as an update address in one of the entries of the selected region, and incrementing said counter corresponding to the selected region;

update address removing means for monitoring said system bus to detect a write-back of data from a dirty block, selecting a region of said update address storage means according to a memory address MW at which the data has been written back and an identifier of a processor from which the data has been written back, and decrementing said counter corresponding to the selected region; and flush executing means, in response to a request from any of said processors, for issuing, to said system bus, a command for sequentially reading update addresses stored in regions among the regions of said update address storage means of which count value is not an initial value, and writing-back into said main memory data of the dirty block indicated by the update address read;

normal data processing means for performing normal data processing while causing said cache flush apparatus to acquire an update address; and checkpoint acquisition means including means for storing into said main memory the context of a data process which is synchronously performed and writing-back, into said main memory, data stored in all of the dirty blocks performed by said flush executing means of said cache flush apparatus, and issuing a command for transmitting the stored commands to said second computer; and said second computer comprises waiting means for starting the normal data processing when said memory update means does not receive a command from said memory update monitoring means.

51. A computer system having at least first and second computers and arranged to periodically extract a checkpoint for restarting an interrupted process, the system comprising:

memory update monitoring means for acquiring a write command generated in said first computer, storing the write command to a main memory and transmitting a stored command to said second computer when it is instructed by said first computer; and memory update means for receiving the command transmitted by said memory update monitoring means to issue a write command, similar to that for said first computer, into a main memory of said second computer, wherein said first computer comprises:
a plurality of processors and a system bus;
a cache flush apparatus comprising:
update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data and storing the memory address MU as an update address in one of the entries of the selected region;

entry reclaiming means for comparing the number of the empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the selected entry from "stuffed" to "empty"; and flush executing means, in response to a request from any of said processors, for issuing bus commands to said system bus each of which has one of the update addresses stored in said update address storage means and causes a write-back of data from the dirty block designated by the update address;

normal data processing means for performing normal data processing while causing said cache flush apparatus to acquire an update address; and checkpoint acquisition means including means for storing into said main memory the context of a data process which is synchronously performed by said processors and writing-back, into said main memory, data stored in all of the dirty blocks performed by said flush executing means of said cache flush apparatus, and issuing a command for transmitting the stored commands to said second computer; and said second computer comprises waiting means for starting the normal data processing when said memory update means does not receive a command from said memory update monitoring means.

52. A computer system according to claim 51, in which said cache memory is an n-way set-associative type memory, and said plural regions of said update address storage means are provided to, one-to-one, correspond to groups each of which is formed by n cache blocks.

53. A computer system according to claim 51, in which the number of entries of each of the plural regions of said update address storage means is smaller than the number of the corresponding cache blocks.

54. A computer system according to claim 51, in which the plural regions of said update address storage means can be selected by the update address.

55. A computer system according to claim 51, in which said update address storage means comprises a dirty block counter for storing a number of dirty blocks corresponding to the regions storing an address of data which is stored as a dirty block; and said update address registering means comprises means for incrementing said dirty block counter corresponding to the selected region, and characterized by further comprising:

decrement means for monitoring said system bus to detect a write-back of data from a dirty block, selecting a region of said update address storage means according to the memory address MW at which the data has been written back and the identifier of the processor from which the date has been written back, and decrementing the dirty block counter of the selected region; and entry reclaiming means, when the value of a dirty block counter is made to an initial value as a result of a decrement performed by said decrement means, for making all the entries of the selected region empty.

56. A computer system according to claim 55, in which said entry reclaiming means, when the number of the update addresses stored in one of the plural regions of said update address storage means is larger than the count value of said dirty block counter corresponding to the region, selects one of the update addresses already stored in the region, issues a command for write-back of data stored in the dirty block indicated by the selected update address into said main memory, and makes the entry in which the update address is stored to be an empty entry.

57. A computer system having at least first and second computers and arranged to periodically extract a checkpoint for restarting an interrupted process, the system comprising:

memory update monitoring means for acquiring a write command generated in said first computer, storing the write command to a main memory and transmitting a stored command to said second computer when it is instructed by said first computer; and memory update means for receiving the command transmitted by said memory update monitoring means to issue a write command, similar to that for said first computer, into a main memory of said second computer, wherein said first computer comprises:
a plurality of processors and a system bus;
a cache flush apparatus comprising:
update address storage means having a plurality of regions each of which has one or more entries for storing the addresses of data held in dirty blocks;

update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block, selecting a region of said update address storage means according to a memory address MW at which the data has been written back and an identifier of a processor from which the data has been written back, detecting, for a predetermined time, whether or. not an update address which coincides with the write-back address exists in the selected region, and removing the update address which coincides with the write-back address;

entry reclaiming means for comparing the number of the empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the selected entry from "stuffed" to "empty"; and flush executing means, in response to a request from any of said processors, for issuing bus commands to said system bus each of which has one of the update addresses stored in said update address storage means and causes a write-back of data from the dirty block designated by the update address;

normal data processing means for performing normal data processing while causing said cache flush apparatus to acquire an update address; and checkpoint acquisition means including means for storing into said main memory the context of a data process which is synchronously performed by said processors and writing-back, into said main memory, data stored in all of the dirty blocks performed by said flush executing means of said cache flush apparatus, and issuing a command for transmitting the stored commands to said second computer; and said second computer comprises waiting means for starting the normal data processing when said memory update means does not receive a command from said memory update monitoring means.

58. A cache flush apparatus according to claim 57, in which said update address removing means, upon detecting that a cache block storing data of a given address is not a dirty block, selects one of the plural regions of said update address storage means based on the given address and, when it detects an update command coincides with the update address in the selected region, removes the update address.

59. A computer system according to claim 57, in which the number of entries of each of the plural regions of said update address storage means is smaller than the number of the corresponding cache blocks.

60. A computer system according to claim 57, in which the plural regions of said update address storage means can be selected by the update address.

61. A computer system according to claim 57, in which said update address storage means comprises a dirty block counter for storing a number of dirty blocks corresponding to the regions storing an address of data which is stored as a dirty block;

said update address registering means comprises means for incrementing said dirty block counter corresponding to the selected region;

said update address removing means comprises means for decrementing said dirty block counter corresponding to the selected region, and characterized by further comprising:

removing means for removing all of the update addresses stored in the region corresponding to said dirty block counter when said dirty block counter is made to be an initial value as a result of a decrement performed by said decrement means.

62. A computer system having at least first and second computers and arranged to periodically extract a checkpoint for restarting an interrupted process, the system comprising:

memory update monitoring means for acquiring a write command generated in said first computer, storing the write command to a main memory and transmitting a stored command to said second computer when it is instructed by said first computer; and memory update means for receiving the command transmitted by said memory update monitoring means to issue a write command, similar to that for said first computer, into a main memory of said second computer, wherein said first computer comprises:
a plurality of processors and a system bus;
a cache flush apparatus comprising:
update address storage means having a plurality of regions each of which has one or more entries for storing the addresses of data held in dirty blocks;
update address registering means for monitoring said system bus to detect an update of data within said cache memory, selecting a region of said update address storage means according to a memory address MU at which the data has been updated and an identifier of a processor which has updated the data, and storing the memory address MU as an update address in one of the entries of the selected region;

update address removing means for monitoring said system bus to detect a write-back of data from a dirty block into said main memory, selecting a region of said update address storage means according to a memory address MW at which the data has been written back and an identifier of a processor from which the data has been written back, determining whether or not an update address which coincides with the write-back address exists in the selected region until said cache flush apparatus detects a command which must be processed next, and removing the update address when an update address which coincides with the write-back address is detected;

entry reclaiming means for comparing a number of empty entries of the region selected by said update address registering means with a predetermined value, selecting a stuffed entry of the selected region if the number of the empty entries is smaller than the predetermined value, issuing a bus command which causes a write-back of data stored in the cache block designated by the update address held in the selected entry, and changing the state of the selected entry from "stuffed" to "empty"; and flush executing means, in response to a request from any of said processors, for issuing bus commands to said system bus each of which has one of the update addresses stored in said update address storage means and causes a write-back of data from the dirty block designated by the update address;

normal data processing means for performing normal data processing while causing said cache flush apparatus to acquire an update address;

checkpoint acquisition means including means for storing into said main memory the context of a data process which is synchronously performed by said processors and writing-back, into said main memory, data stored in all of the dirty blocks performed by said flush executing means of said cache flush apparatus, and issuing a command for transmitting the stored commands to said second computer; and said second computer comprises waiting means for starting the normal data processing when said memory update means does not receive a command from said memory update monitoring means.

63. A computer system according to claim 62, in which when said update address removing means detects a command indicating that all cache blocks for storing data indicated by a certain address are not dirty blocks, said update address removing means selects one of the plural regions of said update address storage means in accordance with the certain address, retrieves the selected region, and removes the update address when an update address which coincides with the write-back address is detected.

64. A computer system according to claim 62, in which the number of entries of each of the plural regions of said update address storage means is smaller than the number of the corresponding cache blocks.

65. A computer system according to claim 62, in which the plural regions of said update address storage means can be selected by the update address.

66. A computer system according to claim 62, in which
said update address storage means comprises a dirty block counter for storing the number of the dirty blocks corresponding to the regions storing an address of data which is stored by the dirty block;

said update address registering means comprises means for incrementing said dirty block counter corresponding to the selected regions;

said update address removing means comprises means for decrementing said dirty block counter corresponding to the selected region, and characterized by further comprising:

removing means for removing all of the update addresses stored in the region corresponding to said dirty block counter when said dirty block counter is made to be an initial value as a result of a decrement performed by said decrement means.

67. A computer system according to one of claims 24 to 45, and 47 to 66, in which said normal data processing means includes a process for turning on said flush executing means of said cache flush apparatus.

* * * * *

UNITED STATES PATENT AND TRADEMARK OFFICE
CERTIFICATE OF CORRECTION

PATENT NO.   : 6,490,657 B1                                                                                   Page 1 of 1
DATED        : December 3, 2002
INVENTOR(S)  : Masubuchi et al.

It is certified that error appears in the above-identified patent and that said Letters Patent is hereby corrected as shown below:

<u>Title page,</u>
Item [57], ABSTRACT,
Lines 10-11, "all of the a dirty block" should read -- all of the dirty blocks --.

<u>Column 30,</u>
Line 60, "store means" should read -- storage means --.

<u>Column 34,</u>
Line 20, "from which the date" should read -- from which the data --.

<u>Column 37,</u>
Line 17, after "storage means according", insert -- to a memory --.

<u>Column 41,</u>
Line 9, "dirtyblock" should read -- dirty block --.

<u>Column 42,</u>
Line 55, after "dirty blocks", insert a comma.

<u>Column 50,</u>
Line 42, after "whether or", delete the period.

Signed and Sealed this

Fifteenth Day of April, 2003

JAMES E. ROGAN
*Director of the United States Patent and Trademark Office*